(12) United States Patent
Genovese

(10) Patent No.: US 7,289,944 B1
(45) Date of Patent: Oct. 30, 2007

(54) SYSTEM AND METHOD FOR HAZARDOUS INCIDENT DECISION SUPPORT AND TRAINING

(75) Inventor: James A. Genovese, Street, MD (US)

(73) Assignee: The United States of America as repressented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/713,828

(22) Filed: Feb. 27, 2007

Related U.S. Application Data

(62) Division of application No. 09/781,512, filed on Feb. 12, 2001, now Pat. No. 7,194,395.

(60) Provisional application No. 60/184,376, filed on Feb. 23, 2000.

(51) Int. Cl.
G06G 7/48 (2006.01)

(52) U.S. Cl. ...................................................... 703/10

(58) Field of Classification Search ..................... 703/2, 703/6; 707/104.1; 340/540; 435/6; 702/19–22
See application file for complete search history.

(56) References Cited

U.S. PATENT DOCUMENTS

| | | | |
|---|---|---|---|
| 6,316,197 B1 * | 11/2001 | Das et al. ................... | 435/6 |
| 6,710,711 B2 * | 3/2004 | Berry ...................... | 340/540 |
| 6,787,104 B1 * | 9/2004 | Mariella, Jr. .................. | 422/4 |
| 6,943,684 B2 * | 9/2005 | Berry ...................... | 340/540 |
| 7,102,514 B2 * | 9/2006 | Berry ...................... | 340/540 |
| 7,194,395 B2 * | 3/2007 | Genovese ..................... | 703/6 |
| 7,249,006 B2 * | 7/2007 | Lombardo et al. ............. | 703/2 |
| 7,266,484 B2 * | 9/2007 | Lombardo et al. ............ | 703/11 |
| 2001/0056435 A1 * | 12/2001 | Quick ..................... | 707/104.1 |

OTHER PUBLICATIONS

"The use of Technology in Preparing Subway Systems fro Chemical/Biological Terrorism", Policastro et al, Sandia National Laboratory, Apr. 1999.*
"NIOSH-DOD-OSHA Sponsored Chemical and Biological Respiratory Protection Workshop Report", Dower et al, US Dept. of Health and Human Services, Jan. 2000.*
"Simulation Analysis of Operation Respond in a Field Setting", Mathur et al, Operation Respond Institute, Texas A&M University, Jan. 1997.*

(Continued)

Primary Examiner—Fred Ferris
(74) Attorney, Agent, or Firm—Ulysses John Biffoni

(57) ABSTRACT

A system and method for providing hazardous incident decision support and training includes a user interface component that receives situation definition data, a hazard assessment component and a decision aid. Decision support advice and decision prompts are presented by the system in response to the situation definition interface and hazard assessment. The hazard assessment and expert advice of the system are updated with elapsed time. In another embodiment of the present invention, graphical user interfaces are provided to display a set of menu entries wherein individual menu entries represent a hazardous incident characteristic. The user may select one or more of the menu entries to create a situation definition. Such definitions may be used, for example, to identify a hazardous agent based upon user-inputted signs and symptoms data.

5 Claims, 15 Drawing Sheets

OTHER PUBLICATIONS

Of "Emergency Response to Incident Involving Chemical and Biological Warfare Agents", Medici et al, NFPA Supplement 14, 1997.*

"Adapting a synonym database to specific domains", Turcato et al, National Laguage Laboratory, Simon Fraser University, Aug. 2002.*

"Advanced Information Technology to Counter Biological Terrorism", Siegrist, ACM SIGBIO Newsletter, ACM 2000.*

"Medical Preparedness for a Terrorist Incident Involving Chemical or Biological Agents During the 1996 Atlanta Olympic Games", Sharp et al, Annals of Emergency Medicine, Aug. 1998.*

* cited by examiner

FIG. 8

ADASHI - Agent Determination - Signs / Symptoms — 1040

Approximate Number of Casualties: 2

Majority Triage Level: Emergent (Green)

Symptomology / Effects (check all that apply):
- ☐ Runny Nose
- ☑ Swelling of Eyes
- ☐ Tightness in the Chest
- ☑ Twitching, Jerking, Staggering
- ☐ Vomiting
- ☐ Wheezing Time to Observation of Initial Symptoms: 1 - 5 Minutes Agent Characteristics
- Odor: Garlic
- Gas Cloud Color:

Residual
- Liquid: ☐ Yes   Solid: ☐ Yes
- Time to Observation of Residual:
- Residual Color:

[ Make Agent Determination ]   1062

1060 — Probable Agent Class: NERVE   Specific Agent: GB

[ Clear ]  [ Reset ]  [ OK ]  [ Cancel ]

FIG. 15

SYSTEM AND METHOD FOR HAZARDOUS INCIDENT DECISION SUPPORT AND TRAINING

RELATED APPLICATION

This application is a divisional application of application Ser. No. 09/781,512, filed Feb. 12, 2001, now U.S. Pat. No. 7,194,395, which was a non-provisional application claiming the benefit of provisional application Ser. No. 60/184,376 filed Feb. 23, 2000.

FIELD OF THE INVENTION

The present invention is related to decision aids and in particular to providing a time-dependent decision aid for responder action to hazardous incidents.

BACKGROUND OF THE INVENTION

In the past decade, Government officials in the United States have expressed heightened concern over the threat posed by weapons of mass destruction and the country's vulnerability to an attack on its own soil. In 1996, Congress passed the Defense Against Weapons of Mass Destruction Act, which designated the Department of Defense as lead agency for responding to an attack by terrorists using chemical or biological hazards. As a result of this law, known as the Nunn-Lugar-Domenici Act, the Defense Department created the Domestic Preparedness Program to train local and state officials most likely to be first responders in the event of such an attack. First responders must make rapid decisions in life-saving and life-threatening situations. Prior to dealing with an actual terrorist incident involving suspected or known chemical-biological hazards, these personnel must be adequately trained to properly react to the various types of hazardous events, for both their safety as well as public safety. This program, now under the Justice Department as lead agency, requires improved technologies and practices to deal with the threat posed by weapons of mass destruction.

The integration of diverse functional elements such as medical and decontamination specialists, hazardous material teams, and explosive ordnance disposal teams, requires substantial planning, coordination and practice. The challenges posed by the dependency and interdependency of multiple operational functions such as these are discussed in several public documents and become apparent when realistic exercises are conducted for first responders. There is clearly a need to integrate these functional elements in order to respond adequately to a terrorist threat or incident. The current documentation and training curricula on this subject are singularly structured to the point of being "stove-piped." For example, decontamination processes and physical protection requirements are generally taught as independent functions. In practice, however, these processes are integrally linked. Decontamination cannot be performed without physical protection, while physical protection requirements are dependent on decontamination actions. The need exists for a tool that tactically relates these functional elements and is responsive to rapidly changing information as responders assess a situation.

Current decision support and training systems for the military include training courses in chemical, biological, and radiological defense, and are directly supported by doctrine such as Field Manuals and Technical Manuals. Detection, decontamination, physical protection equipment and the like are treated as separate and static subjects. Given this, the incident commander must rapidly process information during a hazardous incident and make the appropriate decisions for action based upon his own cognitive abilities to mentally process such information with or without the help of subordinates. Although Training Manuals and Field Manuals may be available, timely access and processing of this information remains elusive, and decisions made on this less-than-optimal information may prove detrimental.

The current civilian decision support and training systems suffer from similar problems. Tactical training is provided to emergency medical technicians, hazardous material technicians, bomb technicians, law enforcement personnel, fire and rescue personnel, and healthcare providers. Specific policy and statutory guidelines are provided in the Code of Federal Regulations to regulate occupational workplace exposure to hazardous materials. From these guidelines, emergency training modules have been developed and are presented at the local, state and federal levels. These courses, too, are presented in modular fashion and are generally taught as independent functional activities. Without better decision aids, the incident commander in a mass casualty incident involving chemical, biological or radiological hazards is likely to become overwhelmed with the large amounts of complicated data that must be processed in a short period of time.

Finally, the current numerical models that perform calculations based on physical transport physics are helpful and can be integrated into the present invention, but as stand-alone models do not adequately support the difficult decisions that the incident commander must make in the event of a genuine incident. These models may even confuse matters for the incident commander faced with a mass of independent and often conflicting data.

What is needed is a computer-based, integrated and multidisciplinary approach that allows for linguistic and numerical range input, provides one or more embedded hazardous assessment models that treat time as a variable to track, includes memory and decision aids, and allows for a training overlay that utilizes the same core algorithms as would be used in an actual hazardous incident.

SUMMARY OF THE INVENTION

A decision support and training system for improving the response to hazardous incidents by civil or military responders acquires situation definition data from a user interface, executes time dependent hazardous assessments, and provides decision aids and prompts. The system integrates the specific tactical functions required to manage a hazardous incident involving chemical or biological agents, or other hazardous materials. Such functions include agent identification and source analysis, physical protection considerations, decontamination, medical treatment, and casualty care. The system performs these functions through a series of software modules executed on one or more computers.

One feature of the decision support and training system is the time-based monitoring of the essential aspects of an event, whether a simulated event for training purposes, an actual incident, or a hoax. In the agent identification function of the system, the time-of-onset of symptoms is used as a distinguisher of possible agents that could have caused the symptoms reported or observed. Agent exposure doses, with or without physical protection equipment, are determined and monitored based on the time of exposure, concentration of agent in the zone of interest, and physical protection factor provided by equipment in use. The time needed for decontamination, medical treatment and casualty care are also determined and monitored by software modules of the system.

Another feature of the system is the use of linguistic variables and numerical ranges for input data. This is particularly useful in the application for which this invention is intended where data must be inputted quickly and thoroughly. The user interfaces of the present invention provide a means to accomplish this purpose. Prompts or menu choices such as "now", "1-5 minutes ago" and "5-15 minutes ago" are used to accelerate data entry where knowledge of the exact time is unlikely to be available. Important signs such as "garlic odor" and symptoms of agent exposure such as "coughing" or "chest tightness" are expressed as prompts or menu choices thus inducing timely data entry of important discriminators.

Another feature of the system is the identification of likely hoaxes where the situation data indicates discrepancies between, for example, 911 calls and other information such as the lack of signs and symptoms indicative of agent exposure. This is a particularly useful function in managing responder assets as hoaxes can tax personnel and equipment availability, interfere with normal public activities, and degrade responsiveness to an actual event.

In both the decision support and training function, the system is used to evaluate the operational alternatives available, and the likely effectiveness of responder action. The training function utilizes the same core processes as would be used by the system in an actual hazardous incident. This, along with the monitoring of elapsed time, provides heightened realism for training purposes. The training scenarios and queries used by the system provide an appreciation for the time dependency of actions, and the database structure of the present invention alleviates the burden posed by vast reference material needed in the decision processes by providing information in an integrated electronic format.

BRIEF DESCRIPTION OF THE DRAWINGS

FIG. 8 is a casualty management screen object.

FIG. 15 is an illustration of results from a sign/symptom agent identification screen object.

DESCRIPTION OF THE EMBODIMENTS

In the following detailed description of the embodiments, reference is made to the accompanying drawings, which form a part hereof, and in which is shown by way of illustration, specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention. The following detailed description is, therefore, not to be taken in a limiting sense, and the scope of the present invention is defined only by the appended claims.

By way of overview, the present invention provides a computer-based decision support and training system for improving the response to hazardous incidents by civil or military responders. The system includes a set of software modules which may be executed on laptop or desktop computers and other portable or stationary electronic devices, such as palm-size or handheld personal computers, and can be used at the site by the incident commander and responders, or at higher echelon operation centers. The present invention can be used to provide individual and collective training at detachment or team locations, at a user's home, or other locations. This system integrates the specific technical functions required to manage a hazardous incident involving chemical, biological, radiological, energetic or other hazards, or a combination of two or more hazards. Such functions performed by the present invention may include an initial agent identification, hazard source assessment, physical protection considerations, decontamination methods, detection and sampling, medical treatment and casualty estimation, and hazard mitigation.

The present invention serves to monitor the essential aspects of an event, whether a simulated event for training purposes, an actual incident, or a hoax. The database structure of the system alleviates the burden posed by vast reference material, offering such information in an integrated electronic format. Team leaders and members can perform trial-and-error learning and build confidence and expertise in different learning environments with this system. Likely hoaxes are identified where key discrepancies appear between data such as threats received via 911 calls and the actual signs and symptoms observed.

Figure 1:
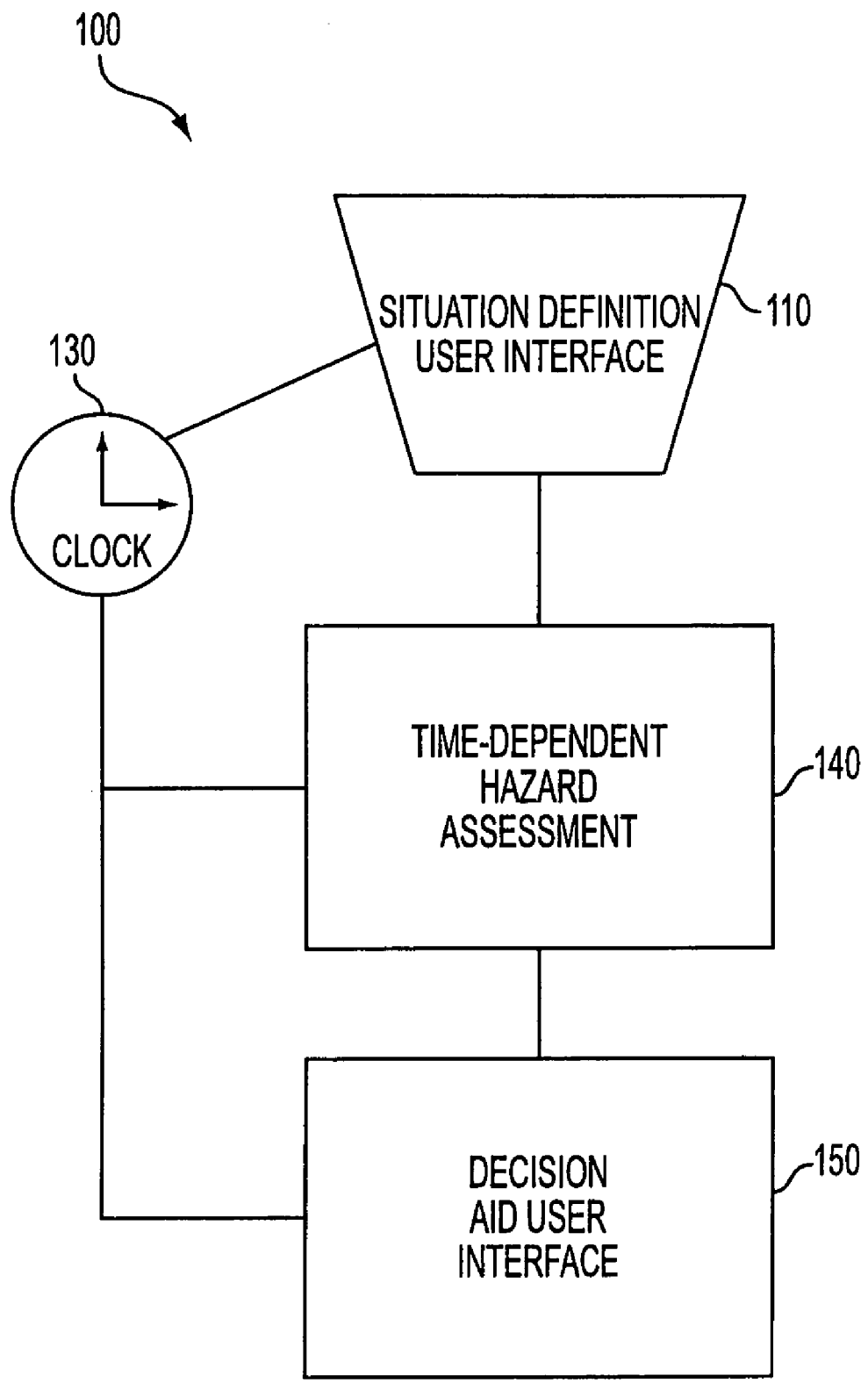
FIG. 1 is a block diagram representing a hazardous incident decision support system.

Turning now to FIG. 1, the components of one embodiment of the present invention are shown. The hazardous incident decision aid system 100 of the present invention includes situation definition interface 110, clock 130, time-dependent hazard assessment component 140, and a decision aid component 150. Situation definition interface 110 allows for the input of data from a user to describe a given situation or condition that may or may not be associated with a hazardous incident. Data may include items such as the time and content of 911 calls, the onset of signs and symptoms if any, environmental conditions, the occurrence of an observed event, the time of occurrence, and other information. Data may be obtained using a graphical user interface, command or menu-type keyboard input, speech-recognition, transfer of data from other sources such as sensors or networked computers, and other means, or a combination of means, to define an actual or hypothetical situation.

Interface 110 enables the user to identify the operational situation by entering information specific to a given situation or circumstance, whether real or hypothetical. Two types of data are processed by the present invention, high confidence data such as time, meteorological conditions, and physico-chemical characteristics, and other softer/fuzzier data originating from a variety of human sources such as 911 calls or statements from initial responders or witnesses.

Situation definition interface 110 may use non-numerical or linguistic variable information and numerical ranges for improved functionality. The basis for this approach is that certain inputs, especially during the initial notification and response phases of an incident, are fuzzy in nature. It is only reasonable to accept this less-than-optimal information as an incident is progressing and not to force faulty numerical estimates to describe a given situation.

Situation definition interface 110 also provides access to memory aids such as check-off lists and menu-based prompts, and allows for user directed queries of the libraries contained within the system. The user can make the choice up-front as to whether to use the tool as a training instrument or to use it in the decision or real event mode. In particular, if used in the training mode, system 110 may be configured to ask questions of the trainee and then to compare the response to the suggested "school" or expert solution. When the tool is applied in the decision mode, the suggested responses are provided as output from the decision aid component using computations performed based upon embedded process functions and data. The incident responder, for example, may be presented with a checklist of potential symptoms experienced by casualties as a function of elapsed time from agent exposure. By selecting the appropriate symptoms and signs, the processing software of the present invention may then determine the probable causal agent. Appropriate physical properties are then obtained from the agent characteristic library and may be used in computing output such as time-dependent vapor concentrations following agent dissemination in a ventilated enclosure. The user in this case would be presented with the resulting hazard assessment and response options. The term "agent" as used in this disclosure should be interpreted broadly to include any substance in gas, liquid, or solid form that can cause harmful effects to humans.

As the initial signs and symptoms present at the site of an incident are critical in assessing the true nature of a hazard and its identification, a graphical user interface or GUI is taught herein for improved collection and analysis of these data. In many cases, a combination of signs and symptoms is so specific that it suggests what has happened and what detectors will best verify the presence of a particular hazard. As illustrated in detail below, a time-based analysis of symptoms from exposure may be used to identify an agent. A drop-down window within interface 110 may be used to provide a listing of the symptoms and allow the user to indicate the prevalent symptoms from incident casualties and observable signs of the hazardous material.

System 100 may also receive meteorology (MET) information and other data such as signals from detectors. The manual or automated tracking of meteorological conditions can be obtained from local weather tracking stations such as airports or news stations. Information can be automatically downloaded from the Internet, obtained via cell phone connections, and other means. Micrometeorological conditions can be monitored at the incident using remote meteorological stations that automatically track environmental conditions and send data to the emergency operations center. The output signals from detectors or sensors and other sources can be received in either digital or analog form and made available where useful to the various components of system 100. Some or all of this data may be made available to the user via interface 110 or interface 150. A MET status screen, for example, may be provided as a pull-down screen on either interface 110 or 150 for use by the incident commander or trainee to review a range of MET conditions including temperature, relative humidity, wind speed and direction. This is useful to the incident commander, for example, as a rapid change in wind direction can adversely affect the staging of hot zone/warm zone operations, location of decon and casualty treatment sites, and access/egress routes.

Clock 130 is linked to all processes within system 100 that are time-dependent, or that require time tracking of some sort. Incident tracking may, for example, utilize the estimated time the incident occurred and the elapsed time since occurrence. Time tracking may also be embedded into the physical protection function described in detail below. This allows emergency responders to coordinate proactive personnel accountability processes that track entry and exit times and hazard doses received while within hot and warm zones. The physical protection function may also monitor over time what activities the responders are performing and track their exposure doses based on the particular protective ensemble that is worn.

Hazard assessment 140 uses data obtain via situation definition interface 110 along with other data and processes, such as input from clock 130, to determine a hazard assessment as a function of time. Assessment 140 may take various forms as described fully below, and may use publicly available hazard predictive models. The present invention also allows for the incorporation of improved models yet to be developed. One example of a predictive model presently available that can be used with the present invention is the "Vapor, Liquid and Solid Tracking Computer Model," VLSTRACK, version 3.0, of October 1999, which predicts hazard concentration and physical transport. This software model is available from the U.S. Naval Surface Warfare Center in Dahlgren, Va. Another predictive model that can be used with the present invention is the "Hazard Prediction and Assessment Capability," (HPAC), version 3.2 of June 2000. This model is available from the U.S. Defense Threat Reduction Agency in Alexandria, Va. Another software model presently available for use with the present invention is the "Personal Computer Program for Chemical Hazard Prediction," (D2PC), version 3.1 of September 1999, which is available from the U.S. Army Emergency Management Information System (EMIS). Also available, is the "Spray Drift Task Force Spray Model" from Continuum Dynamics of Princeton, N.J. Finally, an "Indoor Evaporation Model," (InDeVap), is available from OptiMetrics, Inc. of Forest Hill, Md.

Integration of these and other predictive models with the present invention is accommodated through a multiple domain hierarchy in which hazard prediction models, terrain databases, and other software modules share the input, output, and processing functions of the present invention. Such software integration techniques are well known in the art to which the invention applies. As taught herein, hazard assessment component 140, may be used with a variety of hazard prediction models such as InDeVap, HPAC, D2PC and the like. In this way, time-based assessments of hazards can be presented with greater accuracy and confidence levels using this open architecture technique as compared to a system that relies on a single predictive model.

Decision aid interface 150 presents results from hazard assessment 140 along with memory aids such as check lists, queries and prompts to the user, and receives additional input from the user in the form of decision choices reflecting actual actions taken or hypothetical actions to be analyzed. Decision aid 150 is also time dependent. By way of example, as time passes, even in the absence of any action by incident responders, hazard assessment 140 will change based upon the time dependency of actual phenomenon such as weather, physical transport and hazard exposure, thus changing the possible choices and outcomes presented by decision aid 150. The user is prompted of the time dependent nature of the situation and the possible ramifications of delayed action. A hypothetical mode within the decision aid interface 150 may be used for evaluation of hypothetical scenarios to experiment with different actions during a real or training event, thus enhancing the understanding of response options and likely results.

The system illustrated in FIG. 1 also provides an effective interactive training tool. A trainee can structure a hazardous incident scenario through inputs via interface 110 or utilizing a previously stored scenario. This training component can serve as an adjunct to didactic and practical application training to test the concepts and methodologies the trainee has learned. The trainees can enhance their mastery of the various tactical issues in responding to hazardous incidents by working through a bank of queries set up to test the capabilities of these responders. This programmed learning sequence may use preprogrammed or canned scenarios, or the student may opt to create a custom scenario. The training function focuses on optimizing situational awareness and providing queries and guidance as to what actions might be taken depending on the circumstances present.

System 100 can be programmed to track external data including elapsed time during a training session to simulate the time-dependent and changing nature of an actual event. Depending on the scenario or learning environment, time compression techniques may be applied in certain periods of the learning sequence. Prompting and querying of the user/trainee will demand timely responses, thereby enhancing real-time decision-making prowess. The interactivity of the present invention greatly increases the speed at which competency and understanding are achieved. If the student is weak to begin with, system 100 will bring up fundamental concepts as a programmed learning tutorial. If the student has displayed more competence, the system motivates the student towards a greater level of competency through more challenging and time-critical scenarios.

Some example queries are provided in Table 1 below. These queries, and the approved "school response" or correct answer in accordance with accepted practices by subject matter experts may be provided as a software overlay on the computer-implemented system as taught herein. This training material can take other forms as well, including traditional instructional manuals and the like.

TABLE 1

Training Queries

| Time of Query | Query |
| --- | --- |
| A. Upon Initial Scenario Definition | 1. Is this a real event?<br>2. Why?<br>3. Rate quality of Intel?<br>4. What signs are present?<br>5. What symptoms are present?<br>6. What is the significance of no signs in presence of symptoms?<br>7. What is the significance of no symptoms in presence of signs?<br>8. What is the significance of neither signs nor symptoms in presence of intel? |
| B. After Initial Agent Identification | 1. Should you shelter in place or evacuate?<br>2. Or neither?<br>3. Should you set up perimeter security?<br>4. Should a hot zone be designed, and if so, how?<br>5. What mitigation actions should be taken immediately?<br>6. What mitigation actions should be taken as secondary steps?<br>7. What resources should be deployed (HAZMAT, Bomb Tech, EOD, detectors/sensors)? |
| C. After Hazard Assessment and Before Mitigation | 1. Should you use a vapor suppression barrier?<br>2. Explosive suppression?<br>3. Ventilation?<br>4. Positive or negative pressure system?<br>5. Containment?<br>6. Filtration?<br>7. Other mitigation techniques?<br>8. How will casualties be handled? |
| D. During Mitigation Efforts | 1. Number of personnel in hot zone?<br>2. Number of personnel in warm zone?<br>3. What type of Physical Protection Equipment (PPE) is available for on-scene units?<br>4. What is the protection factor for this PPE?<br>5. What are the expected dosage rates for personnel wearing PPE in hot and warm zones, respectively?<br>6. How much time is allowable in the hot zone?<br>7. How much time is allowable in the warm zone?<br>8. How much time is needed for decon?<br>9. Are there other limiting factors to consider, such as heat stress that would limit exposure time? |

Having provided an overview of the present invention and its uses, attention is now turned to illustrations of specific components.

A situation definition interface 110 is used in the present invention to define relevant data such as time of event, hazard source, signs and symptoms, and hazard location. As illustrated in detail below with reference to specific figures, object oriented input-output displays or windows may be used to effectively define a situation. The situation definition interface 110 of the present invention is integrally linked to clock 130. This linkage is important in determining the elapsed time since the event, and the propagation, and perhaps mitigation, of hazardous material. These interfaces will be taught fully below in specific examples. A key element to be described here is the signs/symptoms processing of the present invention. A sample table of signs and symptoms relevant to hazardous agent scenarios is provided below. As illustrated, signs include such things as color, odor, chemical reactions, and dispersion devices, while symptoms include nausea, headache, tunnel vision, and the like. These observations can be used to provide an indication of the type of hazard present, if any. When coupled with the time-of-onset of symptoms, as taught herein, these data can provide a strong discriminator to use in agent identification.

TABLE 2

Signs and Symptoms.

| SIGNS | SYMPTOMS |
| --- | --- |
| Color | Nausea |
| Odor | Headache |
| Chemical Reactions | Tunnel Vision |
| Dispersion Device | Chest Pain |
| Explosive Event | Vomiting |
| Property Damage | Runny Nose |
| Dead Animals | Reddish Skin |
| Absence Of Signs | Absence Of Symptoms |

By way of example, sarin, a chemical nerve agent, produces miosis (tunnel vision) and chest tightness within seconds or minutes of exposure. It also is colorless and has a fruity odor. This data, when used in the present invention, can provide a strong indication of the presence of sarin when such signs and symptoms present. Mustard, another chemical agent, has a garlic odor, produces eye irritation and reddening in minutes, and causes skin burning in six to twelve hours. In contrast, exposure to a biological agent will generally not cause the onset of any symptoms for days, and the initial symptoms may be expressed in general terms as "flu-like." These indicators and time discriminators are used by the present invention to provide an initial agent identification.

To accomplish this, a database of signs and symptoms, including time-to-onset data, is utilized. The database may be formatted as follows. Each record may be associated with a particular hazardous material. For example, sarin is assigned a unique record in the database. Each column of the database then contains information relevant to the particular hazardous material described in that record. Columns, for example, may be provided for color, odor, eye symptoms, chest symptoms, and so forth along with column entries to provide the time-to-onset for given symptoms. Having created such a database, the following process can then be used.

Figure 2:
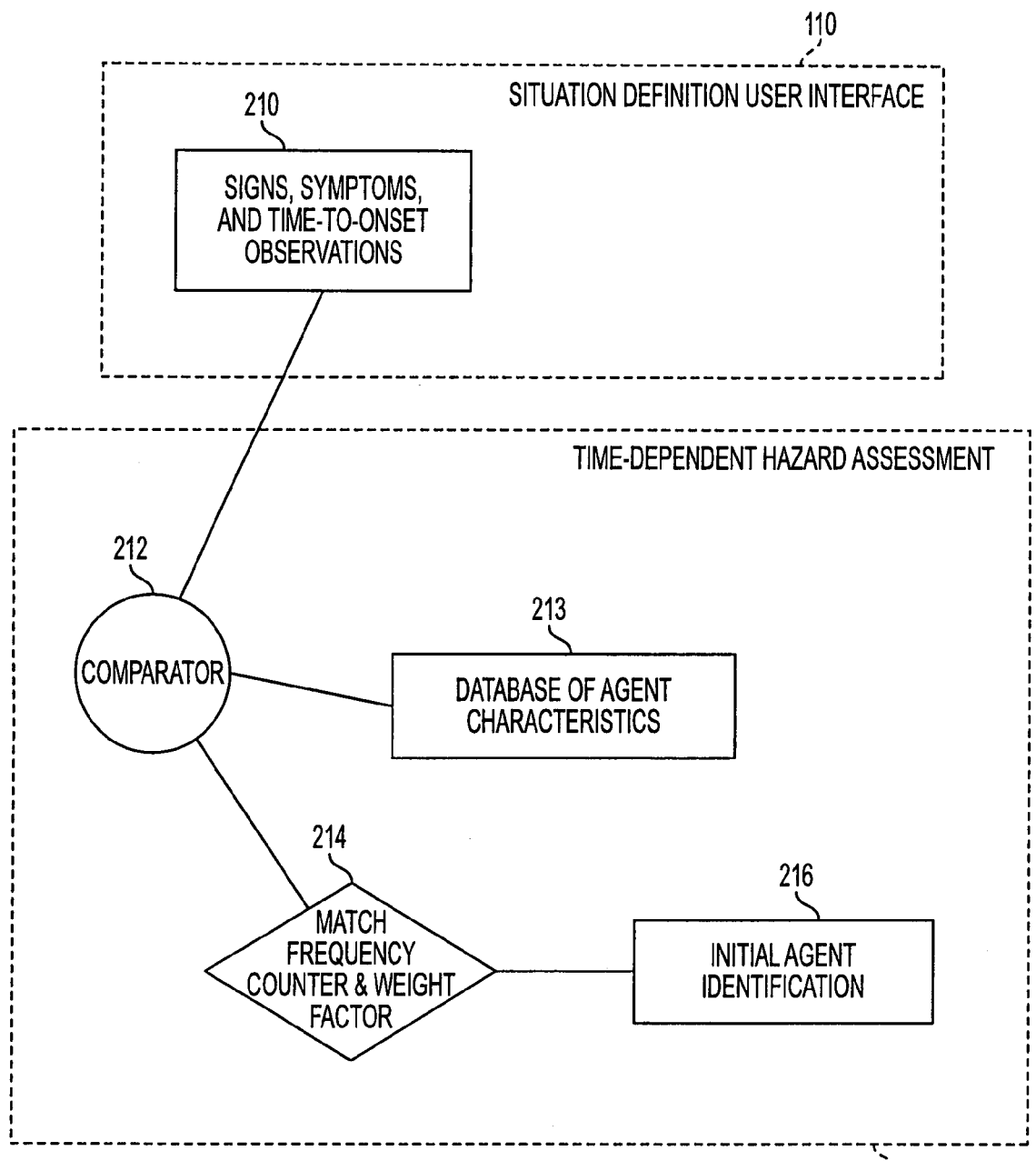
FIG. 2 is a functional block diagram of hazard discrimination based upon signs and symptoms data.

Turning to FIG. 2, a signs and symptoms agent identification process is illustrated. The observed signs and symptoms 210 are inputted by the user with the aid of situation definition interface 110 as illustrated in detail below with reference to several figures. After all the signs and symptoms data are input, comparator 212 is used to compare the observed signs and symptoms with those in the signs and symptoms database 213 described above. In the preferred embodiment of the present invention this comparison takes into account the time-of-onset of the observed symptoms as compared to the corresponding database values for time-of-onset. A frequency counter 214, which may take into account relevant weights of the correct matches as well as mismatches, that is, wrong answers, compares the observed data 210 with each record in the database of signs and symptoms 213. Based upon this comparison, an initial agent identification 216 is provided.

This agent identification can be represented in a formula as provided below. In equation 1, agent identification is determined as the agent having the maximum value resulting from a summation of the number of matching signs, symptoms, and time-of-onset of symptoms, minus any mismatches, that is, discrepancies between observations and known effects of a particular agent, with the option to specify appropriate weights for each match or mismatch. A value or score for each record in the database of agents can be calculated and compared as follows.

$$\text{Agent Identification} = \text{Max}[W_1 \cdot (\text{number of matched Signs})$$
$$+ W_2 \cdot (\text{number of matched Symptoms})$$
$$+ W_3 \cdot (\text{number of matched Times-of-Onset})$$
$$- W_4 \cdot (\text{number of Mismatches})] \quad (1)$$

Where the number of signs, symptoms, and times-of-onset correspond to correct matches; number of mismatches indicates the reported discrepancies or wrong answers; and $W_1$ through $W_4$ indicate the relative weights given to the corresponding matches or mismatches. "Max" indicates a process in which the result or score obtained from applying equation 1 to each record of the database is evaluated to determine the record comparison with the greatest numerical value. For example, suppose that the application of equation 1 to a record of characteristic data of mustard gas, a known chemical warfare agent, results in a value of 12.5, and the same application of equation 1 to a record of characteristics of sarin results in a value of 85, with all other comparison values less than 10. Recall that sarin, a chemical nerve agent, produces miosis and chest tightness within seconds or minutes of exposure. It also is colorless and has a fruity odor. Mustard, on the other hand, has a garlic odor, produces eye irritation and reddening in minutes but not miosis, and causes skin burning in six to twelve hours. Thus a quantitative distinction can be made of possible causation agents. The indicators, and time discriminators, of equation 1 are thus used by the present invention to provide an initial agent identification. The decision aid interface of the present invention in such a case would present the user with the probable identification of sarin as the agent that caused the observed signs, symptoms, and times of onset.

In addition to the identification of a suspect agent, the probability or likelihood of a correct identification may be determined by correlating the resulting value obtained through frequency counter 214, or equation 1, with a pre-determined scale, or by using the relative scores of possible agents. In the above example where sarin received a score of 85 with mustard gas at 12.5 and all other agents at less than 10, the probability of sarin can be estimated by the ratio of its score with all other scores, or by comparing the sarin score with a pre-determined scale and normalizing the results to obtain a 0-100% range.

In this example, one type of data, signs and symptoms, was utilized to perform an initial hazard identification within time-dependent hazard assessment 140. Other data, such as 911 calls or MET information also can be used for agent identification and hazard assessment. Physical transport models may also be used within block 140 for additional assessment results, such as concentration-versus-time data and the effects of mitigation action such as the use of positive pressure ventilation systems.

Figure 3:
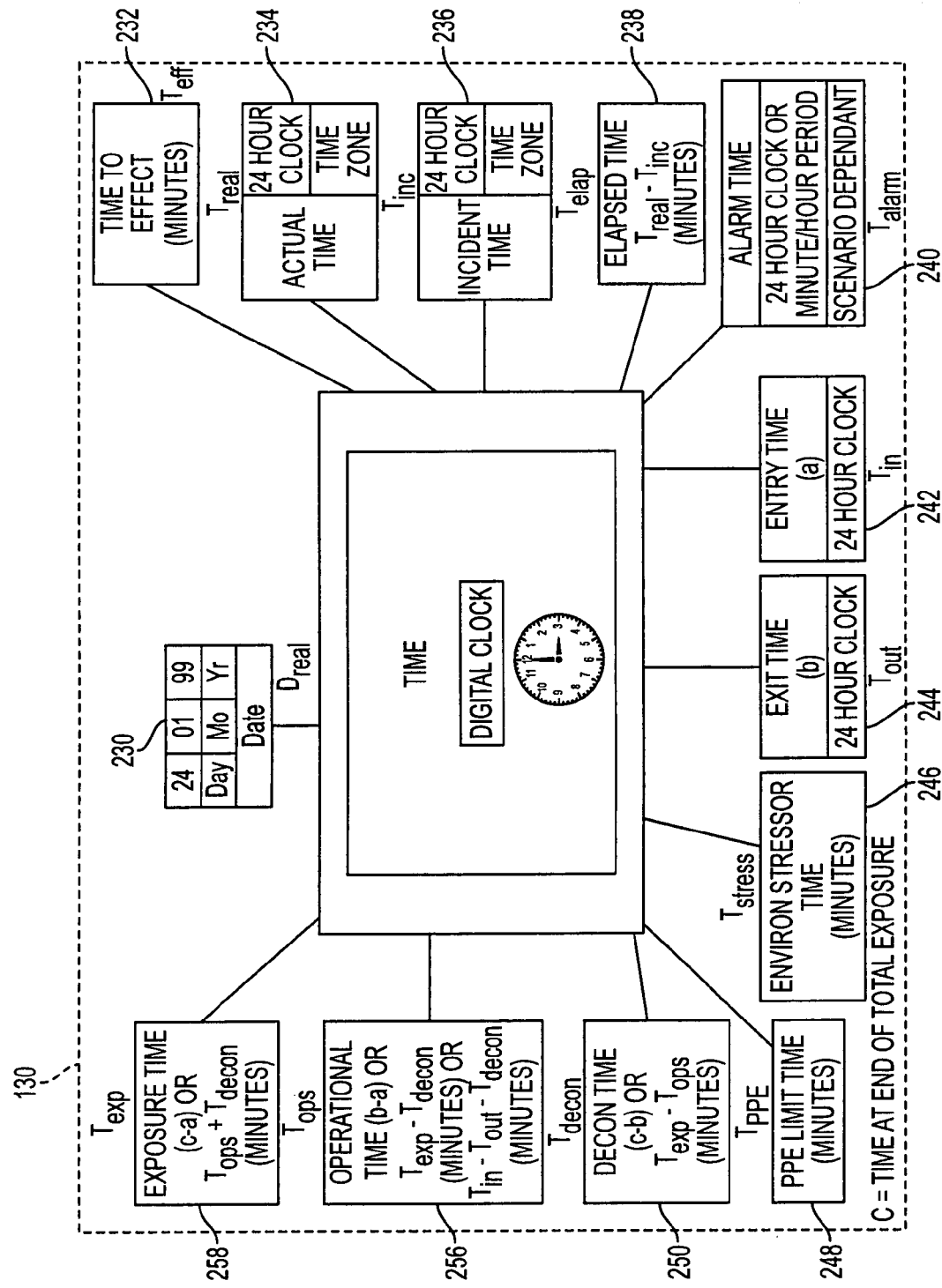
FIG. 3 is a block diagram showing the time monitoring and tracking function of the present invention.

Turning to FIG. 3, the time monitoring and tracking functions of the present invention are illustrated. In both decision-aid and training mode, time monitoring is performed to track the progression and sequence of events, as they unfold, or would unfold, in a real-life scenario. Many table-top or field training exercises develop an assessment or profile as to how well emergency responders make decisions, and how well they implement the training received. What is not generally assessed in prior art training methods is an active time-dependent measure of performance. The time monitoring and tracking function as taught here is linked to all processes that are time-dependent, or require time tracking of some sort. Such linkages are illustrated by clock 130 in FIG. 1 and FIGS. 5-7.

Some of the key time functions of the present invention, in addition to the time-of-onset of symptoms as described above, include elapsed time since the incident occurred and time-based exposure/dosage tracking. The elapsed time since an incident occurred is a critical factor in determining the likely concentration of an agent at a given location relative to the release point, the likely exposure dosage of people within the agent contamination space, and mitigation options. Exposure/dosage tracking provides a proactive means of managing the exposure of emergency personnel who enter the contaminated space for reconnaissance, mitigation action, medical treatment of victims, and the like. Even with physical protective equipment, time is of the essence, as such equipment does not protect the wearer indefinitely. The present invention allows emergency responders to coordinate a proactive personnel accountability process that tracks entry/exit times in the hot and warm zones. Time monitoring is also desirable when assessing the adequacy and functionality of mass decontamination and triage.

As an integrated and interactive decision tool, the present invention links the varying functional response areas with time as an independent variable. Changes in time, meteorological conditions and other event circumstances are monitored. Any changes in circumstances are processed and corresponding changes in advice are made accordingly. In the event that an alarm or action point is reached, immediate queries and prompts are displayed to enhance situational awareness and responsiveness.

Returning to FIG. 3, the various time functions of the present invention are defined. Real Time 234 is the actual time within a specific time zone using the digital 24-hour clock. For example, 4:24 P.M. standard time on the east coast of the United States would be designated as 16:24 EST. Incident time 236 is the time that the specific hazard event occurred based on a 24-hour clock and time zone. Date 230 is expressed digitally as, for example, day/month/year in the form 31050I to represent May 31, 2001. The time zone shown in block 234 and 236, indicates the time zone for the corresponding time variable using standard three-letter acronyms, such as EST for eastern standard time. Elapsed time 238 is calculated as real time 234 minus incident time 236, taking into account the respective dates. Alarm time 240 provides a scenario-dependent time based on operational conditions, which can be used to provide a reminder. Entry time 242 is the time a person enters a hazard area based on a 24-hour clock. Exit time 244 is the time a person leaves the hazard area based on the 24-hour clock. Environ stressor time 246 is the time of exposure to a given environmental stress or hazard, such as elevated body temperature, which can cause heat stress. PPE limit time 248 is the maximum allowable time for a given PPE assembly and agent concentration. Decon time 250 is the time that the responder is exposed while being decontaminated. Operational time 256 is the time that the responder is exposed in a hot or warm zone in the operational mode, that is, excluding decon time 250. Exposure time 258 is the total time that a person is exposed, including both operational time 256 and decon time 258.

Having defined these time variables, the clock function 130 can be utilized by the various parts of the present invention that are time-dependent in nature. By way of example, physical protection equipment and personnel accountability monitoring are performed by the present invention to provide advice, warnings, and alarms when certain conditions occur, such as unsafe hazard dose exposures. The physical protection equipment and personnel accountability function of Table 3, for example, takes into account operational time, exposure time, decontamination time, available self-contained breathing apparatus time, and time-dependent hazard dose limits. Similarly, equations 2, and 11-14 utilize time as an independent variable.

Figure 4:
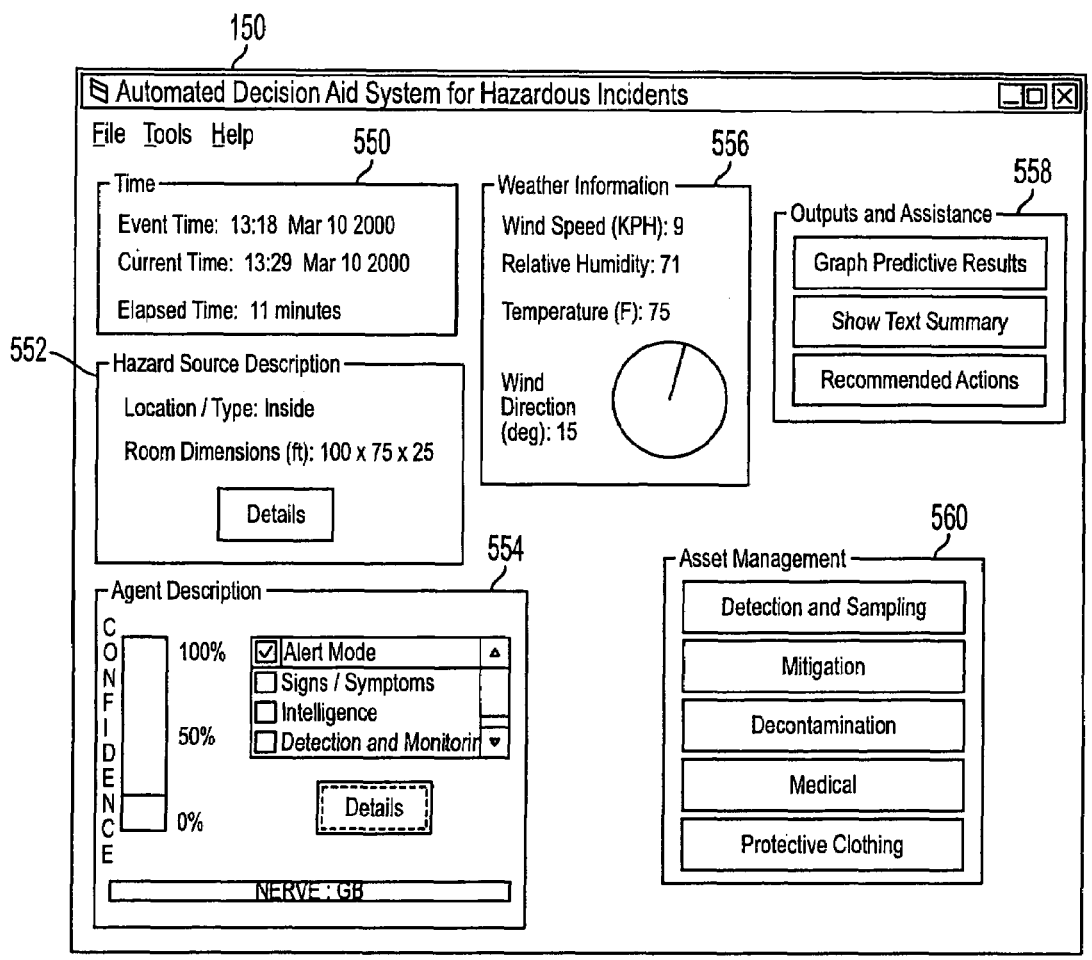
FIG. 4 is an example decision aid user interface in accordance with the present invention.

Turning to FIG. 4, an example decision aid interface 150 is illustrated as it might appear on a computer monitor or handheld device. This element of the present invention provides time information 550, including event time, current time, and elapsed time; a hazard source description 552 with room dimensions and venue information; agent description 554, along with the basis for and confidence level of the agent identification; weather information 556 including wind speed, relative humidity, temperature, and wind direction; various output and assistance tools 558 to be used, such as hazard prediction tools to provide graphical predictive data and recommended actions; and asset management tools 560 including detection and sampling, decontamination, and protective clothing. As will be illustrated in detail below, various data output, hazard assessments, and memory aids such as checklists, queries and prompts are provided through user interfaces such as 150.

Figure 5:
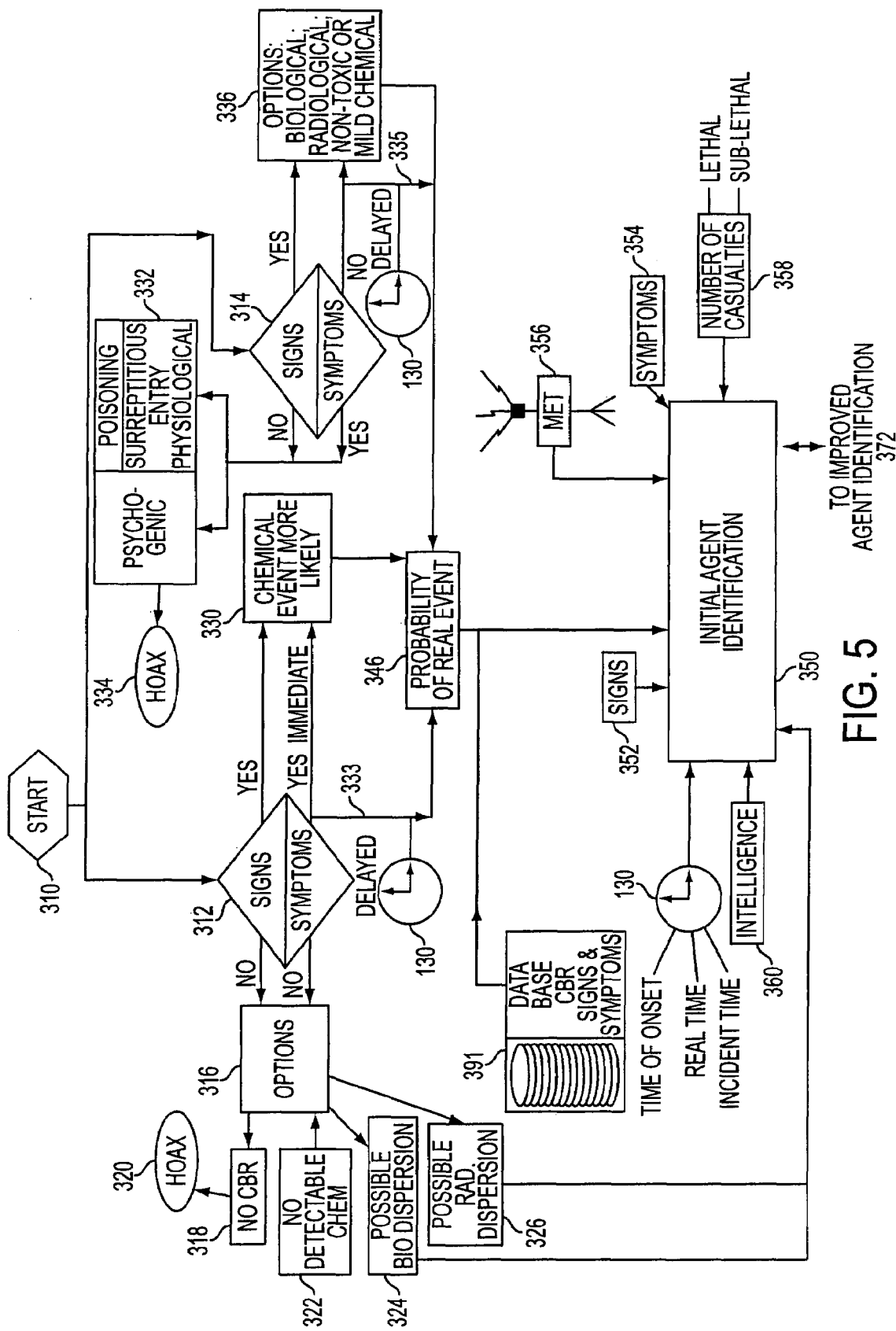
FIG. 5 is a function block diagram showing software modules, data structures, and input and output connections, which comprise a first part of one embodiment of the hazardous incident decision support system.
Figure 6:
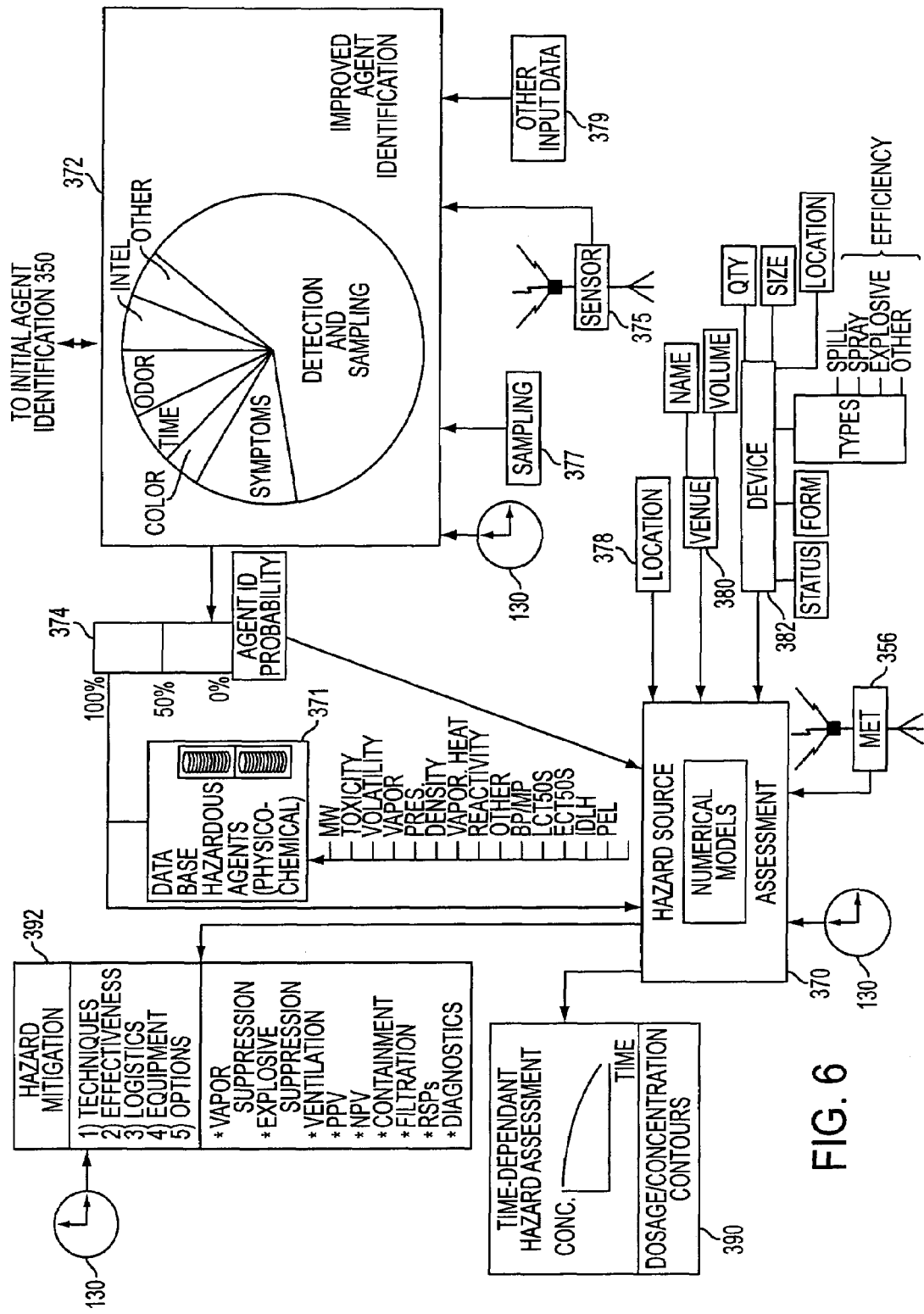
FIG. 6 is a function block diagram showing software modules, data structures, and input and output connections, which comprise a second part of one embodiment of the hazardous incident decision support system.
Figure 7:
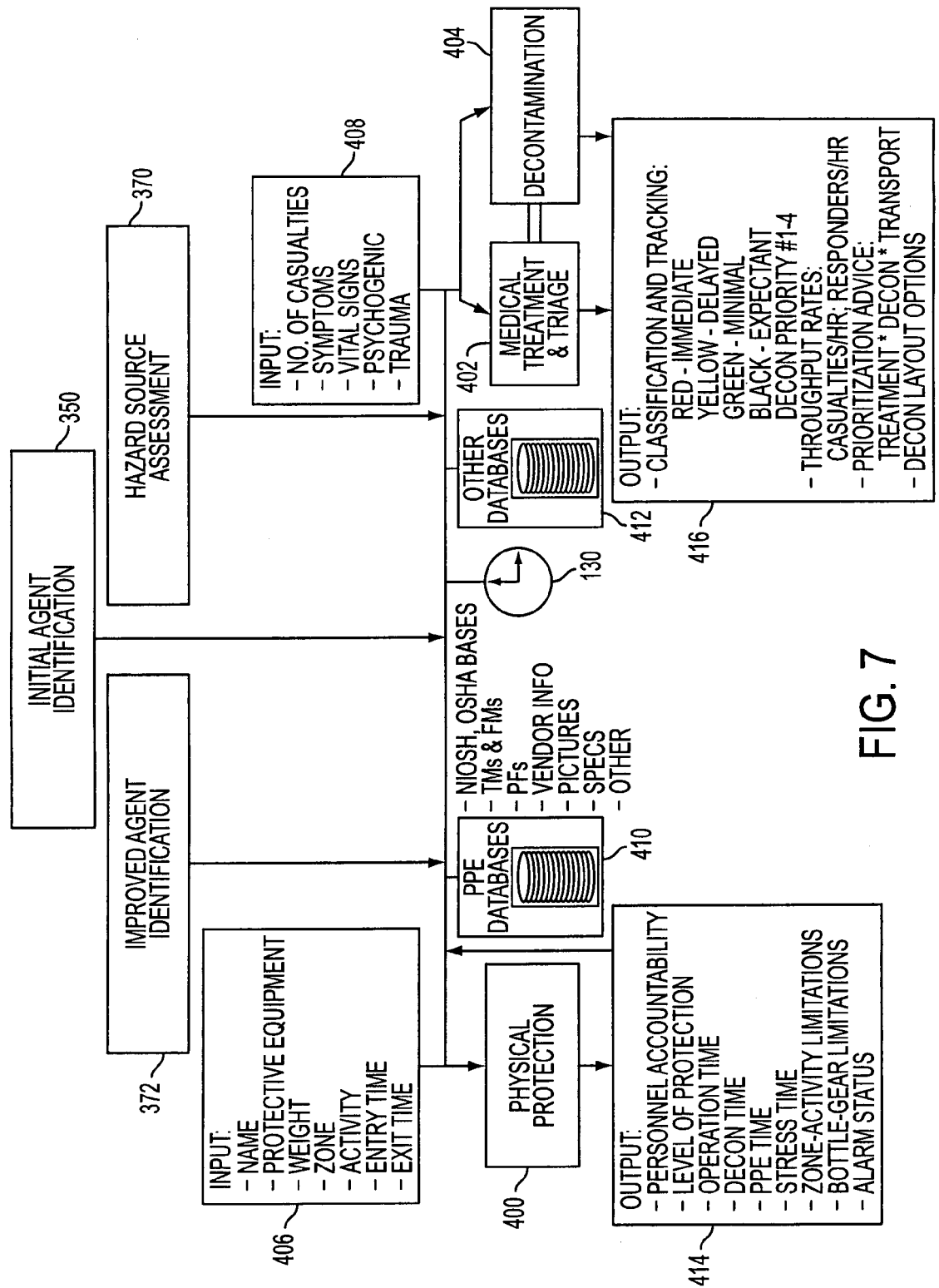
FIG. 7 is a function block diagram showing software modules, data structures, and input and output connections, which comprise a third part of one embodiment of the hazardous incident decision support system.

Turning to FIGS. 5-7, another embodiment of the present invention is illustrated. Seven main software modules or components are described, along with their respective input, output, and processing logic. The main components as taught in this embodiment are initial agent identification 350, improved agent identification 372, hazard source assessment 370, hazard mitigation 392, physical protection 400, decontamination 404, and medical treatment and triage 402.

Beginning with FIG. 5, the process in this illustration begins at point 310 where the system is initiated with input to signs/symptoms blocks 312 and 314. As described above and illustrated further below, such data are used by the present invention to make an initial agent identification. The embodiment illustrated here performs some preliminary discrimination based on the binary logic provided by signs and symptoms data. In particular, the present invention utilizes the fact that there are a limited number of possible combinations of whether or not signs and symptoms are present.

One possibility is that there are neither signs nor symptoms. This condition corresponds to block 316 in FIG. 5. In this case, if it is believed that a chemical, biological, or radiological (CBR) event has in fact occurred, but without observed signs and symptoms, the preliminary indications are a possible biological dispersion 324, or a possible radiological dispersion 326. The likelihood of this condition is increased where there are no detectable chemical agents present as indicated by block 322. However, if there are no CBR agents present, as determined by sensors or sampling, a hoax 320, is likely. Having made these preliminary distinctions, further processing is performed in initial agent identification function 350.

The second possible combination is that there are both signs and symptoms present. Where such signs and symptoms are immediate, the likelihood of a chemical event 330 is greater than a biological or radiological event because the onset of symptoms for exposure to both biological and radiological agents is generally hours, if not days. Where signs are present and symptoms occur after some time has elapsed, as indicated by path 333, a real CBR event is still possible as opposed to a hoax. This condition is recognized in block 346.

Another possible combination is the presence of symptoms in the absence of signs, even after some time has elapsed since observation of the symptoms. This condition is indicated as flowing left from signs/symptoms block 314 into block 332. Here, the indications as illustrated in block 332 point to a poisoning, a surreptitious entry of some hazardous material, or possibly the psychological effect resulting from a hoax 334. While not shown in FIG. 5, as with other preliminary estimates, this information would flow into initial agent identification 350 for further processing. As before, the accurate identification of hoaxes is valuable to avoid undue alarm and wasted effort in the event of a hoax, and under commitment of assets or poor response in the event of a real hazardous incident.

Another possible combination is signs without symptoms. If symptoms present after some delay 335, there is a greater probability of a real CBR event as opposed to a hoax and process flows to block 346, but in the condition that symptoms do not present even after some time has elapsed, additional assumptions can be made as indicated in options block 336. Here it is noted that preliminary indications point to a possible biological event, a possible radiological event, or a non-toxic or mildly toxic chemical event. As before, these preliminary estimates are fed to initial agent identification process block 350 via 346.

In initial agent identification 350, further processing is performed based upon data processed from the presumptions described above, the observed signs 352, observed symptoms 354, time 130, and perhaps other data. Other data may include meteorological or MET data 356, the number of casualties 358, and intelligence 360. Using a database of CBR signs and symptoms 391, an initial agent identification can be made as described in detail above with reference to FIG. 2 and equation 1. The output of this initial agent identification is made available to the user via a user interface, and to other parts of the present invention. As illustrated in FIG. 5, results from initial agent identification 350 flow to improved agent identification block 372 of FIG. 6 where a second and improved agent identification is made.

Turning to FIG. 6, improved agent identification block 372, having linkage to the initial agent identification 350 of FIG. 5, is illustrated along with other elements of this embodiment of the present invention. Improved agent identification 372 includes the observed signs and symptoms data from initial agent identification 350, clock function 130, as well as input from sensors 375, sampling data 377, other input data 379, or a combination of input, thus resulting in a second or improved agent identification. Through the use of detector or sensor and sampling data a better identification of the agent can be made. Equation 1 is thus modified to include the addition of sensor and sampling data as follows.

$$\text{Agent Identification} = \text{Max}[W_1 \cdot (\text{number of matched Signs})$$

$$+ W_2 \cdot (\text{number of matched Symptoms})$$

$$+ W_3 \cdot (\text{number of matched Times-of-Onset})$$

$$- W_4 \cdot (\text{number of Mismatches})$$

$$+ W_5 \cdot (\text{Sensor Input})$$

$$+ W_6 \cdot (\text{Sampling Data})] \qquad (1A)$$

The relative weight of sensor and sampling data, denoted $W_5$ and $W_6$ in equation 1A, will typically be given a greater value than the other weights $W_1$ through $W_4$, to reflect the greater accuracy of this information in comparison to observed signs and symptoms data. This reflects the fact that sensor and sampling data is generally objective, whereas signs and symptoms data, especially the latter, are generally subjective in nature. Thus, equation 1A of the present invention allows for the relative weighing of this data in the agent identification process.

Other data may be included in the improved agent identification process 372 with individual weight factors as illustrated by equation 1B. While additional computer resources are required for the processing of equation 1B over equations 1 and 1A, this formula results in an even greater agent identification capability.

$$\text{Agent Identification} = \text{Max}[W_1 \cdot (\text{number of matched Signs})$$

$$+ W_2 \cdot (\text{number of matched Symptoms})$$

$$+ W_3 \cdot (\text{number of matched Times-of-Onset})$$

$$- W_4 \cdot (\text{number of Mismatches})$$

$$+ W_5 \cdot (\text{Sensor Input})$$

$$+ W_6 \cdot (\text{Sampling Data})$$

$$+ W_7 \cdot (\text{Time Data})$$

$$+ W_8 \cdot (\text{Intelligence})$$

$$+ W_9 \cdot (\text{Number of Casualties})$$

$$+ W_{10} \cdot (\text{Distribution of Casualties})$$

$$+ W_{11} \cdot (\text{MET Data})] \qquad (1B)$$

The output of improved agent identification process 372, or equations 1A or 1B, provides an improved agent identification and a likelihood or probability of correct identification as illustrated in probability bar 374 of FIG. 6. These data, along with a database containing the physical properties of hazardous agents 371, are utilized in hazard assessment process 370. The physical properties within database 371 may include such data as molecular weight, toxicity, volatility, vapor pressure, density, and other data useful in a hazard source assessment.

Returning to FIG. 6, hazard source assessment 370 receives input from clock 130, meteorological data 356, and information on the location of the incident 378, venue 380, and any device 382 that may have been found or observed in relation to the hazardous incident. The output of hazard source assessment 370 may be in the form of advice and recommendations on what actions to take, a concentration versus time chart 390, or a combination of advice, recommendations, and analytical results. Hazard mitigation 392 may be provided by the present invention for further recommendations, analyses, and expert assistance based upon the results of hazard assessment 370. Here, mitigation techniques, their respective effectiveness, logistics and equipment considerations, and options may be presented and analyzed. The effectiveness of such mitigation techniques, or combinations of mitigation techniques, may be analyzed here to calculate the effect on end results, such as concentration versus time data.

Turning to FIG. 7, physical protection 400, medical treatment & triage 402, and decontamination 404 are illustrated along with their respective input, output, and links to other elements of the invention. Physical protection function 400 provides a time-dependent tool for monitoring hazard dosage exposure, environmental stressors, and other operational considerations related to responder safety and performance. Individual-specific data, such as a person's body weight, type of protective equipment worn, incident zone in which the responder is presently operating, and the responder's activity and time of entry into the hazard zone, are utilized. Alarms are provided to warn of potentially dangerous situations based upon hazard dose exposure calculations, protection factors, and acceptable safety margins.

To illustrate this function, a sample output table from physical protection function 400 is provided below at Table 3. As shown, the name of each responder is listed in the first column. In this example, two responders are listed, Smith and Gonzales. The type of physical protection equipment worn by each responder is provided in the second column denoted PPE. Next, the zone and activity of the responders are provided. As will be described fully below, these data, along with time-based data, are used to determine hazard exposure doses and to automatically monitor occupational safety limits; a critical function for the safety and effectiveness of hazardous incident responders.

Smith is slated for a technical decon while Gonzales went through the emergency decon corridor.

Note from the exposure time entries that Smith presently has 30 minutes in the hot zone with an estimated 20-minute decon requirement. This has resulted in a warning under the alarm status column as Smith's SCBA time limit is 60 minutes and the responder is already committed for a total of 50 minutes. As will be described fully below, safety limits are provided in the present invention to automatically warn of approaching risk situations, such as Smith's approach of the SCBA air-supply limitations. In this way, the user is provided with an early warning of possible situations, which if left unchecked, would pose unacceptable risks. This warning function is provided by the present invention along with an output function that conveys valuable information to the user in a way that is easily and rapidly understood. This is important in the application for which the invention is intended to serve, as time is of the essence in making sound decisions on the deployment and extraction of personnel. When such a warning condition occurs, a screen object or icon may be superimposed over other output to explain the rationale for the warning, the nature of the situation, and the time-critical response that is required to avoid injury. As illustrated, the present invention performs time-dependent hazard assessments and provides decision support advice and decision prompts in response to these time-dependent hazard assessments.

Having provided a basic introduction to physical protection function 400, attention is now turned to the detailed input, output, and processing steps performed by the function. As illustrated in FIG. 7, input 406 includes data such as

TABLE 3

Physical Protection Output

Physical Protection Equipment and Personnel Accountability

| Responder | PPE | Zone | Activity | Time In | Time Out | Exposure Time Ops | Exposure Time Decon | SCBA Time | Re-Entry? | Decon | Alarm Status |
|---|---|---|---|---|---|---|---|---|---|---|---|
| Smith | A | HOT | RECON | 13:05 | | :30 | [:20] | :60 | OK | Tech | Warning |
| Gonzales | S | WARM | Extraction | 13:15 | 13:30 | :15 | :05 | | OK | Emerg | OK |
| CURRENT TIME: 13:35 | | | | | | INCIDENT TIME: 12:05 | | | ELAPSED TIME: 1:30 | | |

In this example, Smith is presently in a hot zone performing a recon mission while Gonzales was previously in a warm zone where the responder performed an extraction. As illustrated in Table 3, this information is easily determined and understood through the columns labeled zone, activity, and time. Note that Smith has not left the hot zone and therefore the corresponding time-out is blank whereas the corresponding time-out entry for Gonzales is indicated as 13:30. Gonzales has also completed a decontamination process as indicated by the entry of 5 minutes in the decon time column. In contrast, Smith has not begun decon as indicated by the bracketed estimate of the decon time to be expected for Smith, in this example 20 minutes. Smith is using a self-contained breathing apparatus, or SCBA, as indicated by the 60-minute time limit in the SCBA time column. Both Smith and Gonzales are presently eligible to reenter a hazard zone based upon their current respective hazard dose, as indicated by the "OK" entries in the column labeled re-entry. As indicated by the next column, decon, the names of the personnel to be monitored, the protective equipment worn by each responder, their respective body weight and zone of operation, the activity being performed by each responder, and their respective time of entry to, and exit from, the designated zone. Other data may be supplied as input, or derived from other input, or obtained via PPE database 410, clock 130, and other databases 412. Derived data include personnel accountability information such as the total number of personnel in warm zones and hot zones at any given time, the elapsed time since entering a hot or warm zone, and the protection factor afforded by the equipment specified. Additional data are provided to physical protection function 400 from other parts of the invention, such as initial agent identification 350, hazard source assessment 370, and improved agent identification 372 as illustrated in FIG. 7.

Linguistic variables, such as "warm zone" and "hot zone" may be used to indicate the relative concentration level and risks associated with particular areas. Activity levels are used to specify the level of physical activity for a particular responder. This information is important in accurate calculations of limiting factors. Heat stress, for example, can vary considerably for different levels of activity when wearing PPE. Respiration rate is affected, which in turn, influences hazard dose as fully explained below. Activity level also influences air supply limitations when wearing SCBA gear.

In addition to the input data described above, other data may be included in physical protection function 400. Remote physiological monitoring, for example, may be used to obtain directly from telemetry instrumentation the responder's vital functions such as heart and respiration rate, blood pressure, and body temperature. This information would then be displayed as part of output 414.

Output 414 includes such items as personnel accountability data, level of protection, operation time, decon time, PPE time, stress time, zone-activity limitations, bottle-gear limitations, and present alarm status. Hazard dose exposures, even in protective equipment, are monitored. Personnel CFR 1910.120, and the Emergency Response Guidebook, available from the U.S. Department of Transportation, Research and Special Programs Administration at web site http://hazmat.dot.gov/gydebook.htm.

An example PPE database record is illustrated in Table 4 below. The information includes, for each piece of equipment listed, its name, identification number if available, type or function of the equipment, protection factor afforded with proper use of the equipment, operational and decontamination information, the shelf life of the item, its cost, other key information on its use, and the scheduled replacement date. As can be appreciated, this information provides a valuable asset management and decision tool for the incident commander and others, as the appropriate equipment for a given hazard can be selected from the available onsite inventory. Conversely, use of incompatible or outdated equipment can be avoided with the information provided by the present invention.

TABLE 4

PPE Equipment Database Record

| Name | ID# | PPE Type | PF | Ops Info | Decon Info | Shelf Life | Cost | Other Data | Replace MO/YR |
|---|---|---|---|---|---|---|---|---|---|
| M40 | M40 | APR | 500 | FM# TM# | FM# | 10 yrs | $180 | Silicone Rubber | January 2009 |
| Scott Air Pack | N/A | SCBA | 10,000 | Vendor Manual # | Vendor Manual # | 7 yrs | $600 | Air Supply: One (1) hr | March 2006 | accountability output 414 also is used to display the location of personnel by zone and the PPE ensemble in use. The level of protection may be expressed numerically in terms of a protection factor denoted PF. Alarms for various exposure limits are provided in output 414 as a warning of danger based on environmental dosage, protection factor, activity level, and other factors. Additional output, such as the amount of equipment that has been utilized and contaminated, and the amount of equipment remaining in reserve, may also be provided in output 414.

PPE database 410 includes information from NIOSH and OSHA sources, military technical manuals (TM) and field manuals (FM), protection factors afforded by physical protective equipment, and other information useful in physical protection function 400, such as equipment vendor information, pictures of equipment assemblies, and equipment specifications. While this information is available to the public from government agencies, equipment vendors and other sources, the present invention provides this reference material in an easily accessible and understandable format. This is important in the time-critical application for which the present invention is intended. Data within PPE database 410 includes information on protective suits, hoods, over garments, undergarments, cooling systems, air-purifying respirators, self-contained breathing apparatus, and quick donning emergency masks. Other data, such as the chemical compatibility of materials may also be provided in PPE database 410. Specific PPE information for each piece of equipment may include the estimated or published shelf life, protection factors, fit factors, cost, operational deployment considerations, decontamination and cleaning procedures, and other information. These data are readily available from technical and field manuals, equipment vendors, other users of OSHA regulated equipment, and like sources. See, for example, Occupational & Safety Health Act Regulation, 23

Having discussed input and output, attention is turned to the processing steps and calculations used by physical protection function 400. Equations are provided below to calculate various exposure dosages, the total exposure dose, and occupational safety limits, which are used to provide alarm limits and warning indicators.

The first dosage calculation to be illustrated, environmental dosage, which is denoted ED, is the dosage accrued through exposure to a given hazard concentration, EC, integrated over a specific exposure time, $T_{EXP}$. While environmental dosage levels seldom remain constant, this integration may be simplified by using a finite number of constant concentration levels for a given time increment. By way of example, two concentration levels and two corresponding exposure times are used to represent the exposure during operation and decontamination phases respectively. The integration to compute environmental dosage, ED, is then a summation as illustrated in equation 2.

$$ED = [EC \cdot T_{ops}] + [DC \cdot T_{DECON}] \qquad (2)$$

Where environmental concentration, EC, is the environmental concentration of the hazard during the operational phase of interest; decon concentration, DC, is the concentration during the decontamination phase of interest; operation time, $T_{ops}$, is the time within the hazard area for operations; and decon time, $T_{DECON}$, is the time it takes to decontaminate for a specific event.

Protection factor, PF, is the dimensionless ratio of the concentration differential afforded the wearer of specific items of physical protection. It is obtained empirically by testing equipment in a controlled hazardous exposure test and monitoring the amount of hazardous material that migrates beyond the PPE barrier. The protection factor, PF, can thus be obtained using equation 3.

$$PF = EC_{withoutPPE} / EC_{withPPE} \qquad (3)$$

Where $EC_{without\ PPE}$ is the environmental concentration of the hazardous material without physical protection equipment; and $EC_{with\ PPE}$ is the environmental concentration of the hazardous material with physical protection equipment, that is, the concentration of hazardous material that makes it through the physical protection equipment barrier. By way of example, a self-contained breathing apparatus, SCBA, has a typically protection factor of 10,000, whereas a quick donning emergency mask may have a PF of 500.

Hazard Dose, Hd, is then the effective environmental dose corrected for the particular protection ensemble worn. The hazard dosage is calculated for each path of exposure. For inhalation, the calculation takes into account respiratory rate, denoted RR. Similarly, for exposure through skin contact, the calculation takes into account deposition rate on skin surfaces, Dv. The hazard dose, Hd, is thus calculated as illustrated in equations 4-5.

$$Hd_{inh} = PF_{SCBA(inhalation)} \cdot ED \cdot RR \qquad (4)$$

$$Hd_{skin} = PF_{suit(skin)} \cdot ED \cdot Dv_{skin} \qquad (5)$$

Where environmental dosage, ED, is obtained as above; $PF_{SCBA\ (inhalation)}$ is the protection factor afforded against inhalation of hazardous material when wearing a self-contained breathing apparatus; $PF_{suit\ (skin)}$ is the protection factor provided against skin exposure to hazardous material when a protective suit is worn; and $Dv_{skin}$ is a skin dosage conversion factor based upon the rate of mass deposition of environmental hazard on skin surface.

Hazard dose total, $Hd_{TOT}$, is the then calculated as the total hazard dose including all routes of entry. Routes of entry may be expressed as inhalation $Hd_{inh}$, percutaneous $H_{skin}$, and other routes $Hd_{other}$. The total hazard dose, $Hd_{TOTAL}$, may then be calculated by summing the hazard dose from all entry routes as illustrated in equation 6.

$$Hd_{TOTAL} = Hd_{inh} + Hd_{skin} + Hd_{other} \qquad (6)$$

As noted above, respiration rate, RR, is the amount of air inspired in a unit of time, typically one minute, and is important in determining hazard dose resulting from inhalation pathways, and other occupational factors such as heat stress and SCBA time. Data for respiration rate may be provided by remote physicalogical sensors attached to each responder, or may be determined based upon average rates for the specified activity level, ambient temperature, and equipment in used. By way of example, a responder in Level A protective equipment performing a reconnaissance mission will experience a high rate of activity, therefore the estimated respiration rate will reflect this level of activity. Linguistic variables are provided by the present invention to specify activity levels, such as "high" resulting in a RR of 60-70 liters/min, "medium" to denote 40-50 liters/min, and "low" for 15-30 liters/min.

Hazard effect dose, denoted $ED_{50}$, is the dose found to produce a defined toxicological effect, such as miosis or tunnel vision, vomiting, convulsions, breathing difficulty, chest pain, and even death. The $ED_{50}$ can be predetermined based on empirical toxicological information or can be inputted via a pull-down menu. These hazard dosages are generally body weight dependent and adjusted for body weight of the effected person. Where body weight data are omitted, the present invention may utilize an average body weight of, for example, 70 Kg. To monitor when the individual responder is approaching an $ED_{50}$ effect, a comparison is required of the $ED_{50}$ value with the actual hazard dose received. This is monitored in the present invention to provide an early warning of the approach of undesirable exposure limits in responder personnel. As illustrated by equation 7 below, a ratio may be used to establish a safety margin, or operational safety factor (OSF). A default maximum allowable value for OSF may be provided along with the ability to specify acceptable margins of safety based upon the particular situation presented. OSF may then be calculated as follows.

$$OSF = ED_{50} \cdot (body\ weight)/Hd_{TOT} \qquad (7)$$

Where $ED_{50}$ is the hazard effect dose and the other variables are as defined above.

Having calculated OSF, warnings and alarm conditions are thus provided by the present invention as expressed in equations 8-9 below.

$$\text{Warn when: } OSF > SL_1 \qquad (8)$$

$$\text{Alarm when: } OSF > SL_2 \qquad (9)$$

Where $SL_1$ and $SL_2$ are safety limits greater that 1.0. As described above, the user of the present invention may accept default values, or input acceptable operational-dependent values for safety limits $SL_1$ and $SL_2$. By way of example, $SL_1$ may be set at 1.2, and $SL_2$ at 1.5.

If responder personnel are required to reenter a warm or hot zone, the hazard dosage can be calculated as illustrated above for each exposure event, and added to determine a cumulative OSF value using equation 10. In this example, the responder has entered a hazardous area three times. The cumulative OSF is then determined as follows.

$$OSF = ED_{50} \cdot (body\ weight)/[Hd_{TOT1} + Hd_{TOT2} + Hd_{TOT3}] \qquad (10)$$

Where $Hd_{TOT1}$ is the hazard dose received during the first entry; $Hd_{TOT2}$ is the hazard dose received during the second entry; $Hd_{TOT3}$ is the hazard dose received during the third entry; and the other variables are as defined above. The number obtained through equation 10 can then be compared with the acceptable safety limits as illustrated in equations 8-9 above to provide a warning and alarm, respectively.

Having computed the total hazard dose and occupational safety factor, other limits may be obtained by the present invention as follows. Recall that the acceptable time limit for continuous use of a particular PPE ensemble may be entered as input to the PPE function or obtained from the PPE database. Such data is denoted here $T_{PPE}$. A safety limit may then be established for automated monitoring by the present invention based upon the following equations, 11-12.

$$\text{Warn when: } [T_{ops} + T_{DECON}]/T_{PPE} > SL_1 \qquad (11)$$

$$\text{Alarm when: } [T_{ops} + T_{DECON}]/T_{PPE} > SL_2 \qquad (12)$$

Where $SL_1$ and $SL_2$ are user-specified safety limits or default values, greater that 1.0; $T_{PPE}$ is the acceptable time limit for continuous use of a particular PPE ensemble; $T_{DECON}$ is the expected time required for decontamination; and the other variables are defined as described above. The value $T_{DECON}$ could be eliminated or discounted from the above formulas where appropriate. For example, the decontamination station may have collective physical protection equipment that would eliminate or reduce the need for utilization of the responder's personal PPE during decontamination. In such cases, the above formulas may be overly conservative. If so, this can be corrected by eliminating $T_{DECON}$ or by decreasing the safety limit values. In the alternative, a more conservative approach as illustrated would account for a worst-case scenario where the responder must use physical protective gear throughout the decontamination process.

In a similar manner, heat stress limits may be provided by the present invention using equations 13-14.

Warn when: $[T_{ops}+T_{DECON}]/T_{STRESS}>SL_1$ (13)

Alarm when: $[T_{ops}+T_{DECON}]/T_{STRESS}>SL_2$ (14)

Where $T_{STRESS}$ is the acceptable time limit for operation in a given PPE ensemble and a given ambient temperature environment and activity level and the other variables are as defined above.

As illustrated above with reference to the various occupational safety limits, the present invention performs time-dependent hazard assessments and provides decision support advice and decision prompts in response to these time-dependent hazard assessments.

Returning to FIG. 7, medical treatment & triage 402 and decontamination 404 are discussed next. In the response phase of a hazard incident, the scene and surrounding community are likely in a state of confusion. Good decision advice is needed quickly for rapid decontamination of exposed victims and immediate and appropriate medical treatment. The decision on what action to take first is difficult to make when decontamination, medical treatment, and transport are all important steps. This is especially important in scenarios involving weapons of mass destruction as failure to decontaminate casualties, clothing, equipment and the like before transport may result in more victims exposed to a hazardous agent. The present invention therefore links the decision aid and asset management functions of medical treatment & triage 402 with decontamination function 404.

Input 408 includes such items as the number of casualties, the symptoms and vital signs presented by the casualties, any psychogenic indications that the reported symptoms are psychologically based, as opposed to the result of physical injury, and any additional physical or psychological trauma information. Other data may by provided by the user to either medical treatment & triage 402 or decontamination function 404, or both. Functions 402 and 404 also may receive data from other databases 412, clock 130, as well as other parts of the invention, including improved agent identification 372, physical protection 400, and hazard source assessment 370.

Output 416 includes a classification and tracking system, throughput rates for treatment and decontamination of casualties and responders, and prioritization advice, all of which are illustrated further below.

In the preferred embodiment of the present invention, a systematic process is used to categorize and prioritize casualties. Victims able to understand directions, talk, and walk unassisted, for example, are defined and categorized as ambulatory. Many ambulatory victims are further categorized for medical triage purposes as minimal, denoted "green," and accordingly are low priority for medical treatment. As taught herein, however, these casualties may be a higher priority for decontamination depending on other factors such as proximity to agent release or actual physical evidence of agent contact to the person's body or clothing. Non-ambulatory casualties are defined as people who are unconscious, unresponsive or unable to move unassisted. Non-ambulatory casualties are generally provided priority medical triage classification, and are treated in order from "red" (immediate) to "yellow" (delayed) to "black" (expectant).

Factors considered in establishing decontamination prioritization of ambulatory victims are as follows. Casualties with serious medical symptoms that match agent symptoms receive a high decon priority, as do casualties with evidence of liquid deposition on clothing or skin, and those casualties reporting exposure to vapor or aerosol. Also casualties closest to the point of release are provided a high priority. These high priority decon cases may be denoted as "decon 1," whereas lower priority decon cases may be denoted "decon 2" or "decon 3." If decontamination is not warranted, the case is classified as "decon 4." The present invention thus provides a matrix of medical and decontamination priorities as illustrated in Table 5 below.

This three-dimensional prioritization function provides valuable information, as resources for medical treatment, triage, and decontamination are often limited at a hazardous incident site. Also, as described above, the difficult decision on what action to take first is facilitated with the aid of the priority matrix of Table 5.

TABLE 5

Medical and Decontamination Priorities Matrix

| | RED Immediate | | YELLOW Delayed | | GREEN Minimal | | BLACK Expectant | |
|---|---|---|---|---|---|---|---|---|
| DECON 1 | Ambulatory | Non-Ambulatory | Ambulatory | Non-Ambulatory | Ambulatory | Non-Ambulatory | N/A | Non-Ambulatory |
| DECON 2 | Ambulatory | Non-Ambulatory | Ambulatory | Non-Ambulatory | Ambulatory | Non-Ambulatory | N/A | Non-Ambulatory |
| DECON 3 | Ambulatory | Non-Ambulatory | Ambulatory | Non-Ambulatory | Ambulatory | Non-Ambulatory | N/A | Non-Ambulatory |
| DECON 4 | Ambulatory | Non-Ambulatory | Ambulatory | Non-Ambulatory | Ambulatory | Non-Ambulatory | N/A | Non Ambulatory |

The present invention will also query the user to identify what decon facilities are available at the emergency facilities in proximity to the incident, and to specify the capabilities of such facilities. These emergency medical facilities are likely to receive casualties from the incident, either after decontamination or before decontamination. The proximity to the incident and capacity of the facility to handle contaminated victims are key criteria in the decision process as to where, when, and how to decontaminate and treat victims. Also, a certain number of delayed and self-referred casualties must be anticipated. People may leave the incident scene without treatment and without decontamination, only to present later at an emergency facility for medical care. In such cases, medical personnel must be prepared to handle patients who are still contaminated with agent.

A series of sample queries is provided in Table 6 below to obtain information useful in the decision aid process of the present invention. As described below, some of this information may be available from a previously established mass casualty incident plan for the jurisdiction in which the incident occurred.

TABLE 6

Input Queries for Local Emergency Facility Capabilities

DECON Capability

How many hospitals in the area have decon capability?
Where are they located?
Does any mobile or portable decon capability exist?
Detection and Sampling Capability What detectors are available to detect specific chemical, biological or radiological hazards?
Are they calibrated? Where are they located? Can at least "generic families" of hazards be identified?
How will hospital providers determine if self-referred (not incident treated or transported) casualties are contaminated?
How will the ED assess the effectiveness of emergency decon?
What survey instruments are available to measure decontamination effectiveness?
Concomitant Effects Causality Capability Can the hospitals effectively handle concomitant casualties?
Number of Medical Personnel Number of medical personnel presently available?
Are these resources sufficient?
Who should be contacted for additional resources?
Do you have a MASCAL "call-up" plan?
How fast can additional resources arrive?
Are local/federal/state agreements in place to effect mutual aid?
Decontamination Assets How many emergency decon stations can be set up at the incident site?
What is the throughput (e.g. casualties/hour)?
How many technical decontamination stations can be set up?
Physical Protective Equipment (PPE)

Where will medical personnel be stationed at the incident?
Hot zone? Warm zone? Cold zone?
What physical protective gear will be worn and in what zone?
APR (air-purifying respirator)? PAPR (powered air-purifying respirator)?
SCBA (self-contained breathing apparatus)?
Triage System What triage system is employed?
Antidotes, Pharmaceuticals, Chemoprophylaxis What hazard-specific antidotes, pharmaceuticals or chemoprophylax are available?
Medical Support Equipment What medical support equipment is available, for example, how many ventilators?
Mortuary Capabilities Do the local mortuaries have decon procedures for cadavers?
Is a temporary morgue indicated?
What are procedures for evidence preservation and chain of custody?

As many cities in the United States have a disaster plan, sometimes referred to as a mass casualty incident or MASCAL plan, the present invention allows for incorporation of this prerecorded data into the response function, which may eliminate the need for a query as illustrated in Table 6. Such plans often include information on existing decon, triage, and treatment facilities; communication/information management including a coordination mechanisms of call-up, incident communication nodes, compatibility and interoperability; security, traffic control, and hospital access; medical and emergency staff rotation protocols and stress management guidelines; security procedures for identification of authorized personnel; information on the PPE and pharmaceutical stockpile; and a list of short- and long-term medical support equipment.

Recall from the description above, the initial agent identification function 350 includes the reported signs, symptoms, and time-dependency for the appearance of the reported signs and symptoms, which results in an initial agent identification or determination. This initial agent identification function 350 can be refined using detection and sampling data for an improved or second agent identification 372, both of which are available to medical treatment and triage function 402 and decontamination function 404. In this way, signs, symptoms, and suspect agent data are integrally linked to the treatment and decontamination processes described here. This is important because the better the agent identification, the better the medical treatment that can be administered.

Figure 8:
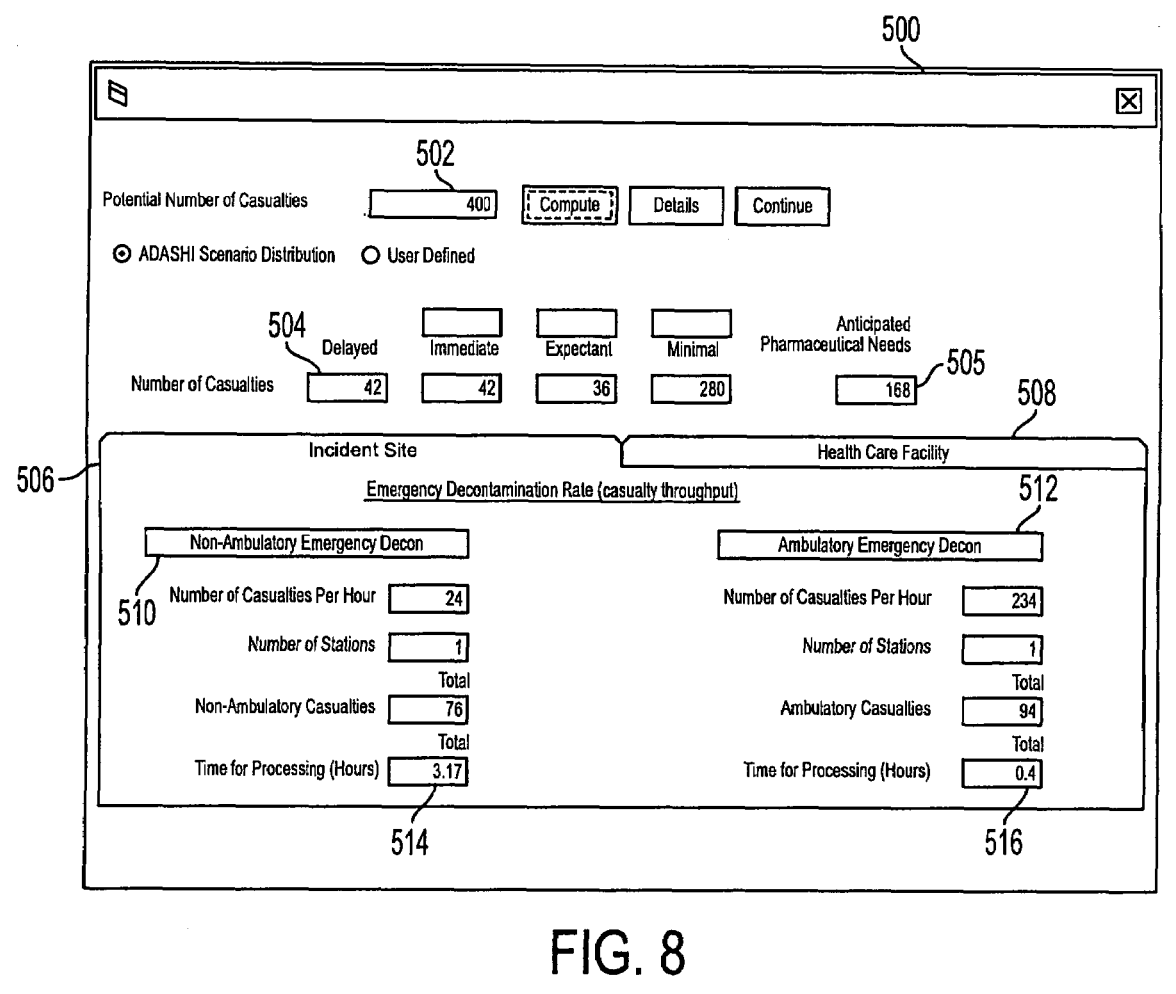

Having received the necessary input for triage and decontamination processing, output 416 may be presented in the form of a status screen, such as that illustrated in FIG. 8, which can be updated automatically or manually to track the number and types of casualties present and the triage and decontamination processes in use, including throughput rates. In this example, screen 500 includes the number of potential casualties 502, and an indication of the basis for this number, whether based upon a computed scenario casualty distribution or defined by the user. The number and distribution of casualties by category is provided 504, along with the anticipated pharmaceutical needs 505. Here, the anticipated pharmaceutical needs 505, is calculated as the sum of the number of delayed casualties and the immediate casualties times two does per casualty. Tabs are provided for incident site 506 and health care facility 508 for easy access to casualty throughput data. In this example, the incident site tab 506 has been selected to view throughput data at the incident site, which is further divided into non-ambulatory 510 and ambulatory decontamination 512. Under each decon category, 510 and 512, the user may specify the number of casualties per hour that can be decontaminated and the number of stations available. The average time available for processing each casualty, as provided at block 514 and 516, is then calculated based upon the number of casualties in the respective category and these throughput rates. In this example, each non-ambulatory casualty 514 must be processed, on average, in 3.17 hours based upon the rate of 24 casualties per hour and a total of 76 non-ambulatory casualties that must be decontaminated. Similarly, each ambulatory casualty 516 must be processed, on average, in 0.4 hours. As illustrated, this screen object provides a valuable tool for managing the decontamination and triage process utilizing the three-dimensional medical and decontamination priorities matrix of Table 5 above.

As can be appreciated from the illustration of FIG. 8, various screen objects can be designed to monitor and provide information on the medical treatment and pharmaceuticals administered to casualties; the transport process to include the number and type of casualties transported, the origin and destination, decontamination status, estimated time of arrival, ambulance capacity; and long-term medical requirements to include personnel and specialized equipment. The present invention may also be used to track the wind speed and direction to flag whether hot, warm, and cold zones are properly sited. An alarm can be provided to warn the user if the wind direction changes by some predetermined variance. Memory aids may also be provided with the present invention, including such items as, "Remember: removal of clothing can reduce up to 80% of contamination on victims," and "contaminated clothing collected before decon may still be a source of airborne hazard." Some or all of this information may be presented in the form of a schematic of the decontamination area, with the ability to utilize decision and memory aids, including suggested layouts, equipment information, and operational guidance.

Having provided a detailed description of the various processes and data utilized by the present invention, attention is now turned to an illustration of its use. As described above and illustrated here, the present invention enables the user to work with numerical ranges and linguistic variables. These non-specific or fuzzy data are used for improved functionality because certain inputs, especially during the initial notification and response phases of an incident, are fuzzy in nature. The present invention does not force a user to make what may be faulty numerical estimates to describe a given situation. This is particularly important in the early stages of an incident. Also, as described above and illustrated here, the present invention provides various memory aids and tools at numerous places. Features such as drop-down menus, check-off lists, prompts, user-directed queries and the like are employed to assist the user in both the training mode and real event.

Figure 9:
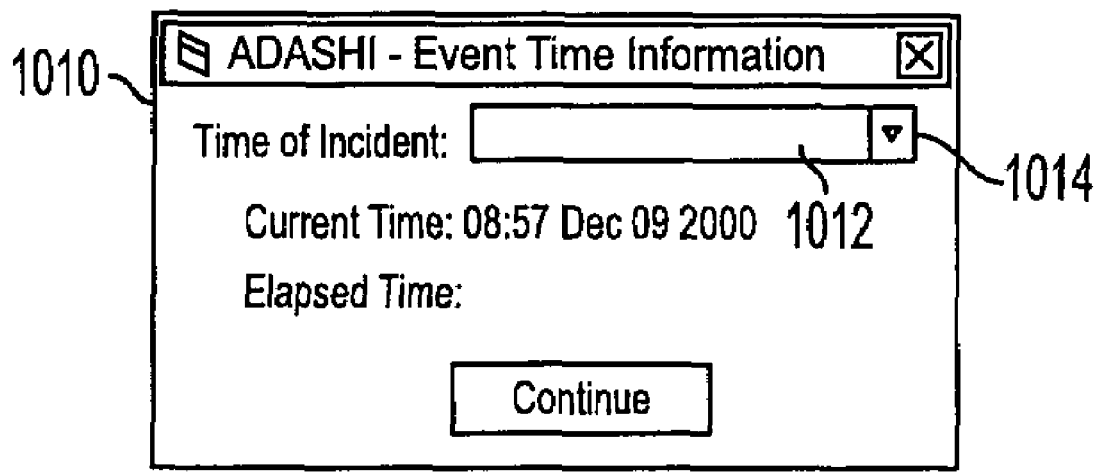
FIG. 9 is an event time information screen object.

In this illustration, the process begins with an event time screen object 1010 as illustrated in FIG. 9. This screen object or window, as displayed on a monitor, provides the current time and date, prompts the user for the time of incident 1012, and provides a drop-down button 1014. The time and date of the incident can be entered directly into time of incident block 1012, or by using the drop-down menu of elapsed times as provided when button 1014 is selected through a process such as a standard point-and-click operation or the touch of a stylus. It should be apparent to the reader that these functions as illustrated here can be performed using various hardware components and with various software. The order and format may also vary greatly from the illustration below while still utilizing the teachings of the present invention.

Figure 10:
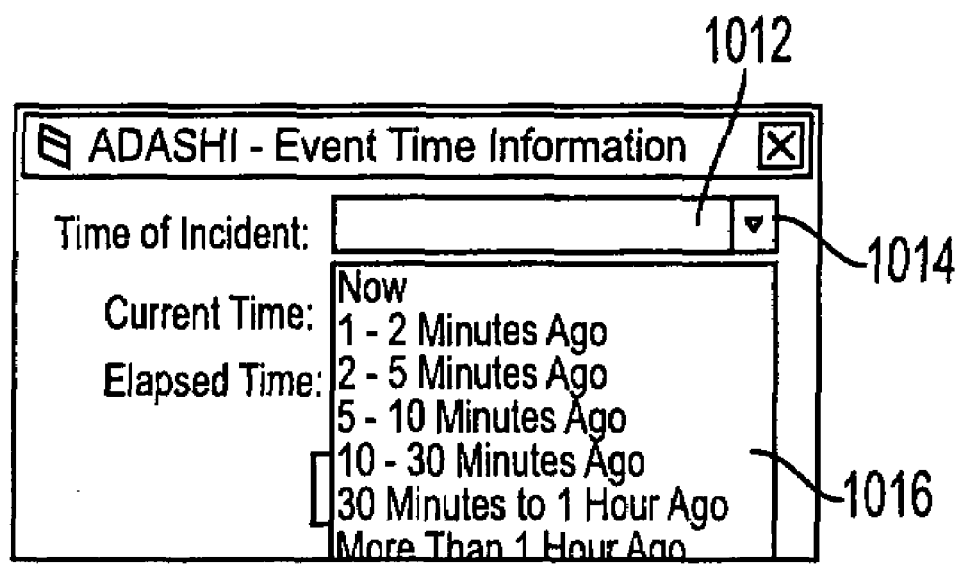
FIG. 10 is a drop-down menu for an event time information screen object.

Given the prompt 1012 for the time of incident, the user here decides to click the drop-down menu 1014 instead of typing in a time and date. The result of this operation is shown in FIG. 10. As illustrated, the elapsed times presented for user selection in response to a drop-down menu button 1014 operation are a combination of linguistic variables and numeric ranges. For example, the time of incident 1012 can be defined as "now" by selecting the first of the options presented in drop-down menu 1016. In the alternative, ranges such as "1-2 minutes ago" and "more than 1 hour ago" are also provided. This simplifies the user's requirement to quickly and accurately define the situation with the best, data available, which may be fuzzy or incomplete, while still providing the necessary input for system processing. Embedded in these options is expert assistance in deciding how best to quantify or express less than perfect data related to a hazardous incident.

Figures 11, 12:
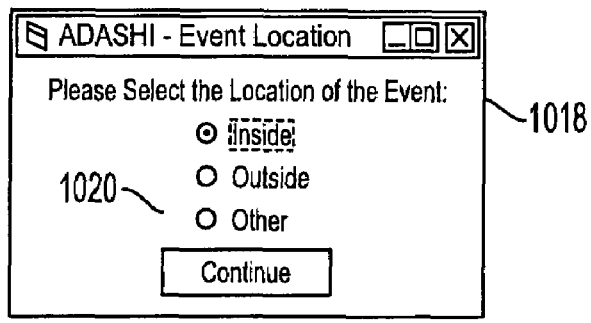
FIG. 11 is an event location screen object.
FIG. 12 is an inside hazardous source description screen object.

Having entered the event time information, the user in this example is then presented the Event Location window 1018 of FIG. 11. Window 1018 is used to specify the location of the event or incident, the terms being used here interchangeably. In this example, the location choices are inside, outside, and other. Various venue classifications can be used in window 1018, such as public building, outdoor stadium, office suite, and the like. Once this basic location information is selected or specified by the user, a more detailed window is provided, tailored for a particular venue or location class, as will be illustrated below.

In this example, the user selects "Inside" as the location specified in window 1018, then clicks on continue, which produces the inside hazard source description window 1022 of FIG. 12. As illustrated in FIG. 12, window 1022 provides a comprehensive yet concise method of describing an inside hazard scenario. As will be shown through this example, the ease of use and memory aids of window 1022 are valuable, especially at the early stages of a hazard event where time may be of the utmost importance. Drop-down menus for source type 1024, amount of release 1026, and natural ventilation 1028 are provided. As window 1022 is specifically designed for indoor venues, prompts for user input of room conditions data 1030 also are provided. In this example, the user has selected a source type 1024 from a drop-down menu as a spill with a release amount of 1101 ml (milliliters). Other common source types and release quantities are provided in the drop-down menus of 1024 and 1026, respectively, for assisting the user in inputting this information. For example, drop-down menu 1024 may include spray and explosive release in addition to spill. Similarly, the drop-down menu 1026 may include mass quantities such as grams in addition to volume quantities such as milliliters.

As illustrated in room conditions block 1030 the user has indicated a room length of 50 ft, width 30 ft, and height 15 ft, with a room temperature of 20 C. The user has also noted in air conditioning block 1032 that an air conditioner is on and that its flow volume is 700 cubic feet per minute (CFM). Similarly, the user describes the Natural Ventilation conditions in block 1028. Here, the user has selected "windows closed" from the drop-down menu within block 1028, which results in an ACH value of 0.074. Other Natural Ventilation choices may include windows open, windows partially open, and no windows.

Where available, positive pressure ventilation and collective protection filtration systems are important in hazard mitigation. The positive pressure block 1036 and collective protection block 1038 of window 1022 provide both a reminder to the user to utilize these systems where available, and an input means for specifying system performance values. When the user clicks on either prompt to indicate that a system is present, additional prompts for the start time of the system and its CFM value are presented. Here the user has indicated the availability of both positive pressure and collective protection systems, and has indicated a start time of 20 minutes and CFM of 20000 for the positive pressure system in block 1036, and 30 minutes and 20000 with an efficiency of 0.997 for the collective protection system in block 1038. These data, as provided by the user with the aid of the present invention, are used in subsequent hazard prediction calculations as illustrated below.

Figures 13, 14:
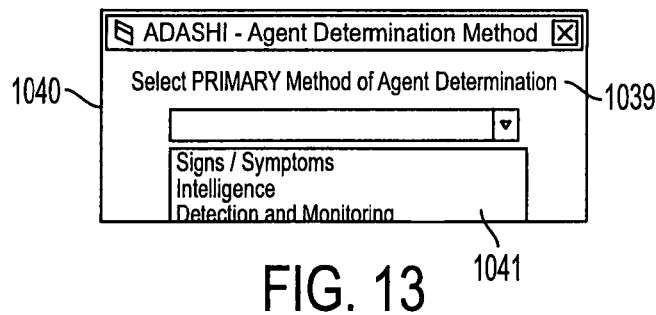
FIG. 13 is a drop-down menu for an agent identification method selection.
FIG. 14 is an illustration of a sign/symptom agent identification screen object.

Having completed input for the inside hazard source description window 1022 of FIG. 12, the user selects "ok" and is then presented an agent determination method window 1040 as illustrated in FIG. 13. A prompt 1039 to select the primary method of agent or hazard identification is provided along with a drop-down menu 1041 of the various methods that may be available using the present invention. Such determination methods may include signs/symptoms, intelligence, detection/monitoring, and other techniques or a combination of techniques. Here, the user selects signs/symptoms as the primary method of agent identification.

An agent determination method—signs/symptoms window 1045 is then presented to the user as illustrated in FIG. 14. As discussed above, the use of signs and symptoms data coupled to the time of onset or effect of the noted symptoms, results in significantly enhanced agent identification outcomes. The time-based agent identification process as described above is illustrated here from the perspective of a user of the invention.

The signs/symptoms window 1045 includes prompts for the approximate number of casualties 1042, majority triage level 1044, symptomology/effects 1046, time to observation of initial symptoms 1048, and agent characteristics 1050. As illustrated in FIG. 14, the user has specified 2 casualties in box 1042, and an emergent (green) triage level in block 1044. The choices provided in the drop-down menu of block 1044 may include urgent (red), less serious (yellow), emergent (green), and non-emergent (black) to describe the general condition of noted casualties.

In this example, the user has noted two symptoms in the symptomolgy/effects block 1046. In particular, the user has noted that the causalities have presented swelling of eyes and twitching-jerking-staggering. As can be seen in FIG. 14, the check off list of block 1046 provides an effective memory aid, descriptive tool, and input device. A drop-down menu 1048 is provided for the time of observation of initial symptoms corresponding to the highlighted symptom in block 1046. As illustrated, the user has highlighted "twitching, jerking, staggering" as the symptom in block 1046, and the time to observation 1048 of this symptom is 1-5 minutes. Again, this is an example of effective memory aids and numeric input data ranges provided by the present invention for improved utilization and performance. Embedded in these memory aids and numeric ranges is expert assistance in capturing less than perfect or reality-based data.

The agent characteristics block 1050 includes odor 1052, color 1054, and residual descriptive data 1056. The drop-down menu for odor 1052 is shown to illustrate another effective memory aid and discriminatory basis provided by the present invention. In this case, a linguistic data-input prompt is utilized. As described above, the odor of a chemical agent, combined with time-based symptomology, can provide a very strong indicator of the presence of a chemical agent, and even the specific type of agent present.

If observed, the user may also specify in block 1056 whether the agent residual is liquid or solid, the time to observation of the residual, and the residual color. Again, these are key observation points, and the present invention serves to remind the user to obtain and consider these data where available. Without such a tool, this valuable information may be discarded, ignored, or subordinated in the analysis process of how best to identify and respond to a hazardous incident.

In this example, the user selects garlic from odor drop-down menu 1052, leaves the residual block 1056 blank, and selects make agent identification. The result of this operation is shown in FIG. 15. Note that the user input data in window 1040 has remained the same, but that the probable agent class 1060 and specific agent 1062 as determined by the present invention are presented along with the user inputted signs/symptoms data. Given the conditions indicated in window 1040, an initial agent identification was made by the present invention, with the probable agent class 1060 being "nerve" and the specific agent 1062 being "GB." After making an agent identification, the user may change any of the data in signs/symptoms window 1040 and make a new agent identification. This feature can be used when new data are obtained, which is common in a real hazard scenario, and also in the training mode to gain insight into likely agent identification outcomes for different observed signs and symptoms.

Figure 16:
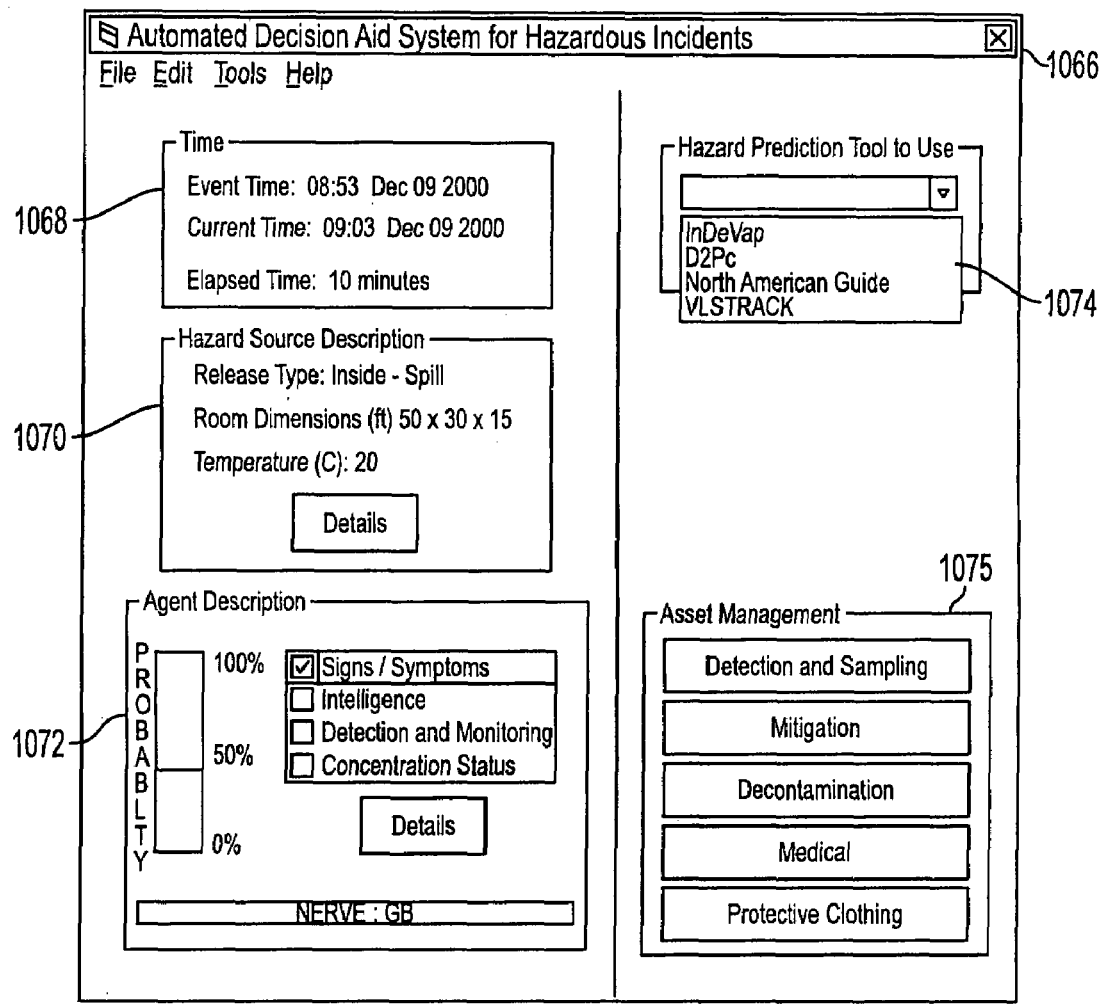
FIG. 16 is an automated decision aid window illustrating the calculated probability of correct agent identification and a drop-down menu of predictive models.

When the user selects "ok" on the signs/symptoms window 1040, the automated decision aid system for hazardous incidents window 1066 of FIG. 16 is presented. In the embodiment illustrated, this window is used to provide time data 1068, hazard source description data 1070, agent description data 1072. Confidence values or the probability or likelihood of correct agent identification also are provided in the decision aid window of FIG. 16. The time block 1068 includes event time, current time, and elapsed time the hazard source description data 1070 includes release type, in this case an indoor-spill, room dimensions, and temperature. The Agent description data 1072 includes the agent class, specific agent identified, probability of identification, and the basis for identification. Details regarding the hazard source description 1070 and agent description 1072 may be obtained by selecting the appropriate details box. When "details" under hazard source description 1070 is selected, the user in this example is presented with window 1022 of FIG. 12. Similarly, when "details" under agent description 1072 is selected, the user is presented window 1040 of FIG. 15. This provides a means of reviewing and updating hazard source and agent identification data for a revised agent identification and probability output 1072. In the operational mode, this provides the user with flexibility and responsiveness to changing circumstances and changing situation awareness information. In the training mode, this feature allows the user to explore the relationship of, for example, signs and symptoms data on agent identification probability.

From window 1066 of FIG. 16, the user may utilize one of several hazard prediction tools 1074, illustrated here in the drop-down menu. These numerical models or tools may include, but are not limited to, InDeVap, D2Pc, North American Guide, and VLSTRACK. As described above, these models are available from a number of sources, and serve to predict the time and space distribution of a hazard given user-specified input parameters, such as the volume of a room and ventilation rate for an indoor event, or wind direction and speed for an outdoor event. When the user selects a particular model to use, three output choices, which appear below the selected model, but are omitted in FIG. 16, appear in window 1066 of FIG. 16 to allow the user to graph results, provide text summary, or make recommendations. Each output may be viewed by selecting the corresponding button, which produces an output window of the predictive model results in the requested format.

Figure 17:
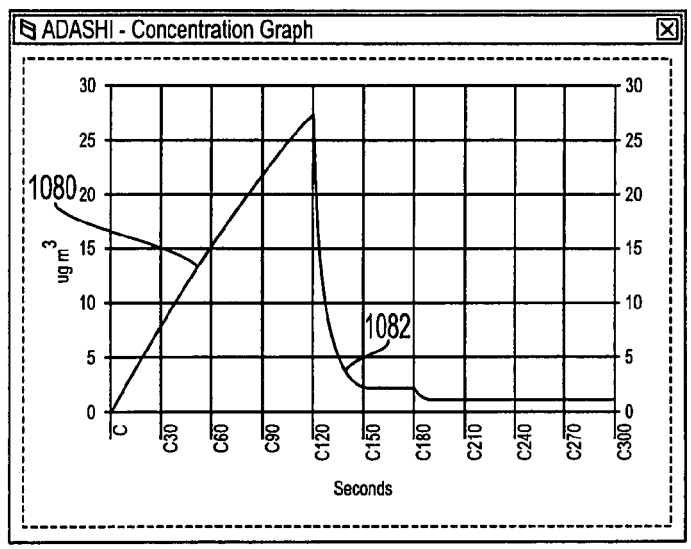
FIG. 17 is an illustration of a concentration versus time chart.

When the user selects "graph results," a chart as illustrated in FIG. 17 is provided. As shown, the output is a graph of concentration versus time. These data may be used to estimate exposure doses for people within the hazard space, and the risk at a given time based on the situation description provided, including the mitigation action taken, if any. As illustrated in the graph 1080 of FIG. 17, the mitigation effect of positive pressure and collective protection as specified in the previous situation definition windows is significant in this example, producing a large reduction in hazard concentration 1082 approximately midway through the time period shown.

Figure 18:
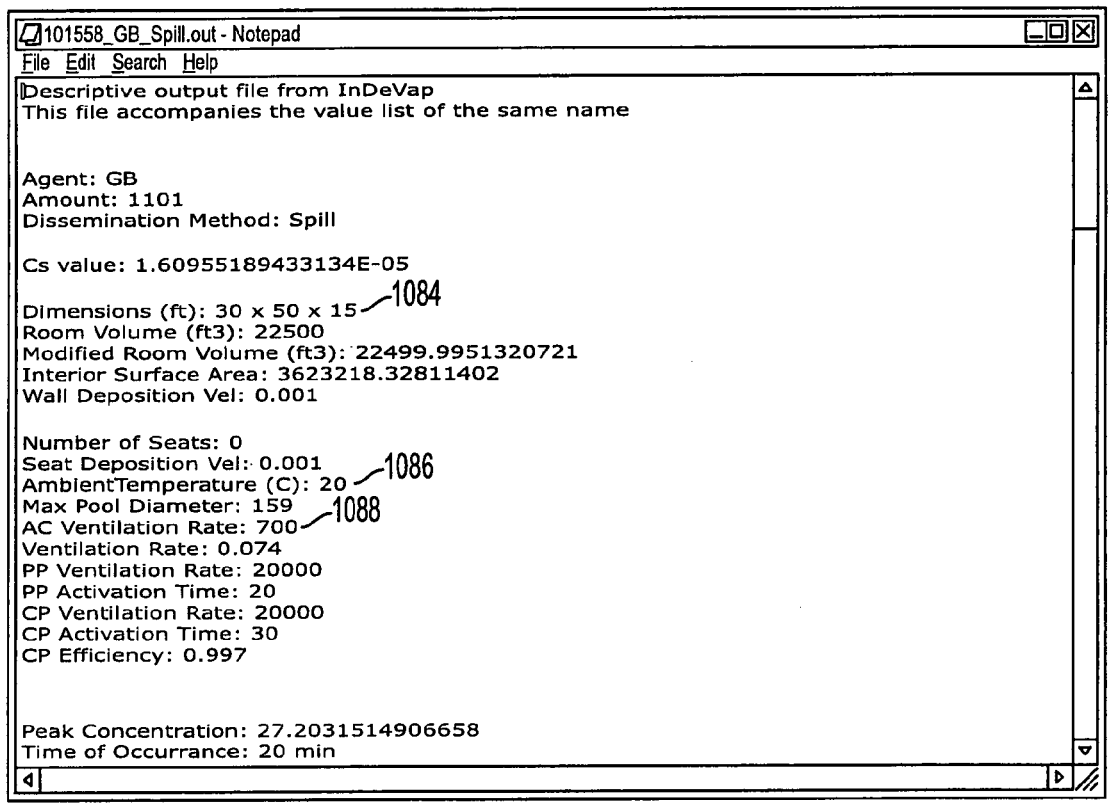
FIG. 18 is a text summary from the predictive model that produced the concentration versus time chart of FIG. 17.

When the user selects provide text summary, a chart as illustrated in FIG. 18 is provided. This chart includes a concise summary of the input to the predictive model and the results obtain therefrom. For example, the situational description data previously input by the user, such as room dimensions 1084, ambient temperature 1086, and AC ventilation 1088, are noted and utilized by the predictive model to produce the concentration-time curve data.

After viewing predictive outputs and recommendations, the user may return to window 1066 of FIG. 16 to utilize the system for its asset management function. The asset management block 1075, as illustrated here, includes detection and sampling, mitigation, decontamination, medical, and protective clothing. Each of these categories represents important management areas to consider and track during a hazardous incident.

Figure 19:
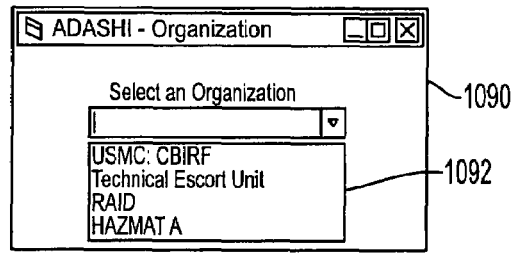
FIG. 19 is an example drop-down menu for asset management.
Figure 20:
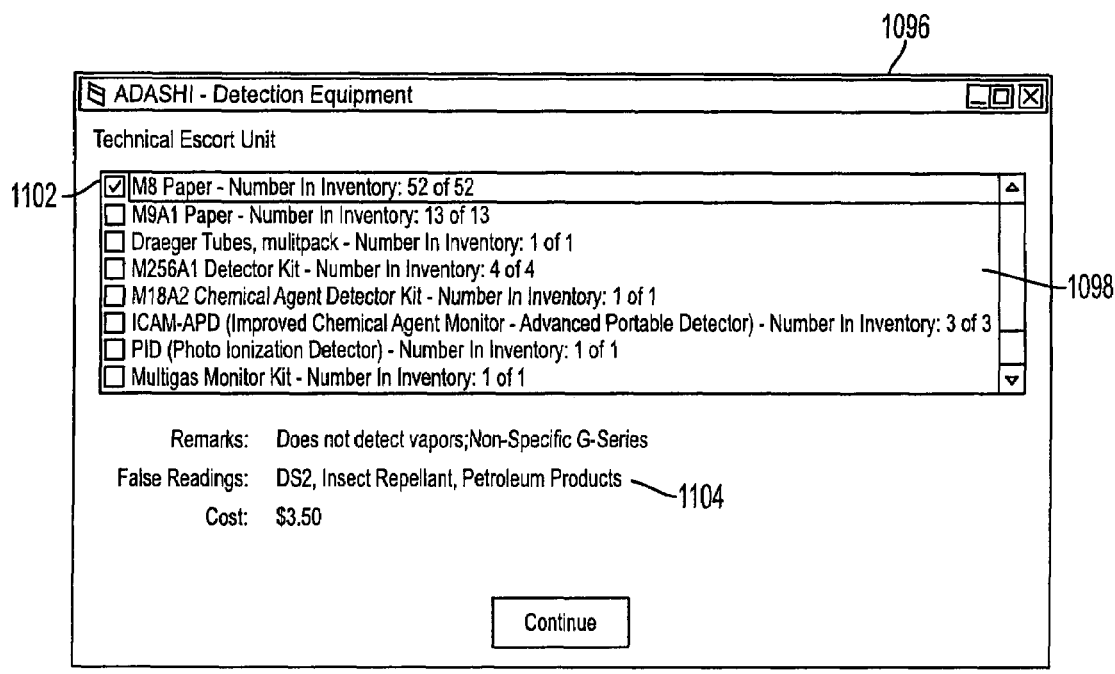
FIG. 20 is an illustration of an asset management inventory for agent detection equipment maintained by the Technical Escort Unit as may be provided by the present invention.

In this example, the user selects detection and sampling, and is presented with the organization window 1090 of FIG. 19. A drop-down menu of organizations 1092 is provided. The equipment inventory of each organization is available to the user through this window by simply choosing the appropriate organizational name from menu 1092, which results in the equipment window 1096 of FIG. 20. Here, the user selected the "Technical Escort Unit." As illustrated in FIG. 20, the equipment inventory of a Technical Escort Unit is listed in box 1098, including the quantity of each type of equipment in the unit's inventory. For example, as can be seen in box 1098 the unit has 52 sets of M8 Paper, 13 sets of M9A1 Paper, and one Draeger Tube. This provides useful asset management information on exactly what resources are available for use. In addition, by selecting any one of the items listed in box 1098, additional information about that item is provided. For example, in FIG. 20, M8 Paper 1102 has been highlighted, resulting in additional information 1104 provided by the present invention. Namely, that M8 paper does not detect vapors, is non-specific for G-series agents, and is subject to certain false readings. This information is valuable as both a decision aid and asset management tool, and may be utilized in both a manual mode and an automated mode.

Having provided a detailed description of the graphical user interfaces of the present invention, attention is now turned to its use as a training tool. As such, the present invention may be used with a training scenario overlay as illustrated in Tables 7-9 below. Scenarios can be loaded from a database library of training scenarios or the user may specify a scenario of interest. When using the system for training purposes, the trainee is presented with substantially the same menus for agent identification, hazard mitigation, and the like, that would be used in a real incident. An example training session begins with a scenario description as illustrated in Table 7.

TABLE 7

Training Scenario Initiation

Friday, 6:05

On Friday morning, the security manager at the New Carrollton Metro Station in southern Maryland near Washington, DC received an anonymous call stating, " a big surprise was in store for Metro commuters this morning." The caller said that, "nerve gas would be exploded at the station." No specifics were given as to the location or time of the event. The caller ended with, "Have a good weekend!" and hung up the phone.
Friday, 6:10

Just a few minutes later, an explosion occurred in the crowded ticketing area below the two escalators leading to the main platform. Although there was a loud noise and smoke from the explosion, no initial casualties were noticed. People from the ticketing area ran out of the terminal screaming. Two subway trains were evacuated and commuters exited via the entry escalator, which leads to the ticketing area and turnstiles. In the panic, many jumped over the turnstiles and there was considerable pushing, resulting in injury to some of the commuters. Many stood outside the parking lot immediately outside, while others hurried to their vehicles in the parking garage.
Friday, 6:10

At 6:15 AM, the Metro security manager called the Prince George's County 911 operator and reported the prior threat call and the incident. The 911 operator recorded the information and notified the county Fire TABLE 7-continued Training Scenario Initiation and Rescue squad and the county Police department.
A local fire engine company was first to respond, followed shortly by two police squad cars. The county HazMat and EOD teams were also dispatched. An EMT unit responded with the engine company.
The people standing in the parking lot began to experience unusual symptoms. People complained about their vision.
Some said things were getting dark. Others experienced headaches and watery eyes, while still others were experiencing chest pain and difficulty in breathing. Some began to fall to the ground, and began to seize. Some people said that the smoke from the bomb smelled like "juicy fruit gum."
Friday 6:25 AM The initial firefighters from the engine company entered the Metro Ticketing area in turnout gear and SCBA, and found that there was one injured woman apparently with a broken leg lying near the turnstiles. She was shaking violently on the floor and was removed to the parking lot outside. In the initial entry, the firefighters noticed the remnants of a small backpack torn apart by the explosion. They also noticed another similar backpack near the newspaper vending machines.
They immediately exited the building. After performing a search of the trains and platform on the second level. The initial EMS team began responding to casualties, but while treating some of the casualties, they also became sick. Symptoms included tearing, sweating, runny nose, tunnel vision, headache, and muscle twitching. The initial engine team relayed the signs and symptoms of this unusual event, and the dispatcher warned the HazMat Team en route of the new occurrences. Metro Security halted train operations at the station, and began to move the ambulatory people to a parking lot opposite the station. Other emergency units arrived and assisted in securing the areas adjacent to the Metro and Amtrak terminal. Metro security rerouted Orange Line trains traveling westbound by terminating service at the Stadium-Armory station. On busy Friday mornings, Metro traffic at New Carrollton is between 300 to 400 people.
Friday, 6:50 AM The HazMat Team arrived around 6:50 AM, with the explosive ordnance disposal team shortly thereafter.

Having received this scenario description, the trainee is presented with the initial agent determination-signs/symptoms window as described above. The training window is substantially the same as the one used in the decision-aid mode. Here, the trainee is presented with additional queries and prompts. For example, given the above scenario, the trainee must correctly input the reported signs, symptoms, and venue information given in the above scenario description within an appropriate time period. If the trainee does not respond in the allotted time period, or enters incorrect or incomplete information, an appropriate notice may be provided along with the estimated consequences of such errors or omissions. The sense of time urgency and realism provided by the training mode of the present invention thus results in enhanced training and simulation utility.

Queries such as those provided at Table 1 above may be used at the appropriate time during the training session. Questions may be presented which stimulate greater learning and understanding such as, "Why is this more likely to be a real agent event as opposed to a hoax? . . . What is the significance of the signs and symptoms presented? . . . Should you shelter in place or evacuate? . . . Should you set up perimeter security? . . . What mitigation actions should be taken immediately?"The previously recorded and stored answers provided by subject-matter experts, as well as the underlying rationale for the answers and other reference material may be provided to the trainee using the present invention.

Returning to the training scenario that was initiated above, the situation may proceed as follows.

TABLE 8

Training Scenario Continuation

The emergency decon team is set up with aid from a neighboring county HazMat team. More engines are called in by the incident commander to assist in emergency and technical decontamination. After the EMS personnel became exposed, the on-site commander established primary and secondary recon teams. A personnel accountability roster was initiated to monitor personnel, actions, and time in the hot and warm zones. The hot zone was established as the main ticketing area in the Metro station, but precluded the MARC/AMTRAK waiting area, which was designated an operational warm zone.

At such point, the trainee may be presented with a personnel accountability status screen as illustrated above with a listing of operators in the warm and hot zones and what activities these personnel are performing. As described above, this is a dynamic time-based display. Queries at this point may include such items as, "With one-hour bottles, the initial HAZMAT team has how long in the hot zone?" . . . "How many times can personnel re-enter the hot zone?" The training scenario may continue as follows.

TABLE 9

Training Scenario Continuation

The exposed EMTs were processed through emergency decontamination then transported to the local hospital. EMT from two neighboring counties were called to provide on-site assistance. Most of the medical providers are performing triage outside the emergency decon corridor. One paramedic donned Level A PPE and is performing triage and medical treatment in the hot zone.

Questions at this point may include, "In what order should the firefighters move casualties through the emergency decon corridor?" . . . "Should atropine be administered, and if so, to whom?" The training scenario may then continue to a final outcome or may be terminated at a certain point by the trainee to either restart training at an earlier time in the simulation, or to end the training session. This provides the option of replaying a portion of the scenario to allow the user to make another attempt at how best to respond to the facts presented. Time compression techniques may be applied at certain points of the learning sequence to shorten training sessions. Finally, external data such as actual weather and traffic conditions may be tracked during a training session to further simulate the time-dependent and changing nature of an actual event.

The training feature of the present invention may also be used as a simulation tool to develop improved response tactics and operating procedures. Given that the outcome of a scenario depends upon the choices made by the user, and the timeliness of the action taken, a realistic gaming type tool is provided wherein the outcome of various responses can be explored against a given situation.

As fully described and illustrated above, the present invention provides a computer-based, integrated and multi-disciplinary approach that allows for linguistic and numerical range or fuzzy input, provides one or more embedded hazardous assessment models that treat time as a variable to track, includes memory and decision aids, and allows for a training overlay that utilizes the same core algorithms as would be used in an actual hazardous incident. As such, it is a valuable tool for hazardous response personnel that must respond to and mitigate the effects of a chemical, biological, radiological, or explosive event.

It is to be understood that the above description is intended to be illustrative and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-readable medium having computer executable instructions for performing a method, comprising:

acquiring observed signs and symptoms data from a user interface, wherein said data is input by a user to describe a given situation or condition which may or may not be associated with a hazardous incident;

acquiring agent characteristic data from records in a database, wherein each record includes data representative of a known hazardous agent; and performing an initial agent identification by comparing the observed signs and symptoms acquired from the user interface with the agent characteristics data for each record in the database, wherein said performing an initial agent identification by comparing the observed signs and symptoms acquired from the user interface with the agent characteristics data for each record in the database comprises using an algorithm selected from the group consisting of: (a) Agent Identification=Max $[W_1 \cdot (\text{number of matched Signs}) + W_2 \cdot (\text{number of matched Symptoms}) + W_3 \cdot (\text{number of matched Times-of-Onset}) - W_4 \cdot (\text{number of Mismatches})]$, wherein W represents the relative weights given to corresponding matches or mismatches, and Max represents a process in which the result or score obtained from applying the foregoing algorithm to each record in said database is evaluated to determine the record with the greatest numerical value; (b) Agent Identification=Max$[W_1 \cdot (\text{number of matched Signs}) + W_2 \cdot (\text{number of matched Symptoms}) + W_3 \cdot (\text{number of matched Times-of-Onset}) - W_4 \cdot (\text{number of Mismatches}) + W_5 \cdot (\text{Sensor Input}) + W_6 \cdot (\text{Sampling Data})]$, wherein W represents the relative weights given to corresponding matches or mismatches, and Max represents a process in which the result or score obtained from applying the foregoing algorithm to each record in said database is evaluated to determine the record with the greatest numerical value; and (c) Agent Identification=Max$[W_1 \cdot (\text{number of matched Signs}) + W_2 \cdot (\text{number of matched Symptoms}) + W_3 \cdot (\text{number of matched Times-of-Onset}) - W_4 \cdot (\text{number of Mismatches}) + W_5 \cdot (\text{Sensor Input}) + W_6 \cdot (\text{Sampling Data}) + W_7 \cdot (\text{Time Data}) + W_8 \cdot (\text{Intelligence}) + W_9 \cdot (\text{Number of Casualties}) + W_{10} \cdot (\text{Distribution of Casualties}) + W_{11} \cdot (\text{MET Data})]$, wherein W represents the relative weights given to corresponding matches or mismatches, and Max represents a process in which the result or score obtained from applying the foregoing algorithm to each record in said database is evaluated to determine the record with the greatest numerical value.

2. The computer-readable medium of claim 1, wherein said observed signs data includes one or more of color, odor, chemical reaction, dispersion devices, explosive event, property damage, dead animals, or absence of signs, and wherein said observed symptoms data includes one or more of nausea, headache, tunnel vision, chest pain, vomiting, runny nose, reddish skin, or absence of symptoms.

3. The computer-readable medium of claim 1, further comprising a sensor for obtaining agent detection data.

4. The computer-readable medium of claim 1, further including a decision aid component operative to provide decision advice and decision prompts in response to the situation definition and time-dependent hazard assessment, wherein decision data are obtained through user response to the decision prompts.

5. The computer-readable medium of claim 1, further including a training component response to the user interface component, clock, and time-dependent hazard assessment component.

* * * * *